US008929065B2

(12) United States Patent
Williams

(10) Patent No.: US 8,929,065 B2
(45) Date of Patent: Jan. 6, 2015

(54) DOCKING STATION WITH RUGGEDIZED CASE

(71) Applicant: L&P Property Management Company, South Gate, CA (US)

(72) Inventor: Steve Williams, Stevens Point, WI (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 14/098,226

(22) Filed: Dec. 5, 2013

(65) Prior Publication Data

US 2014/0168885 A1    Jun. 19, 2014

Related U.S. Application Data

(63) Continuation-in-part of application No. 13/316,003, filed on Dec. 9, 2011.

(60) Provisional application No. 61/734,762, filed on Dec. 7, 2012, provisional application No. 61/526,572, filed on Aug. 23, 2011.

(51) Int. Cl.
*G06F 1/16* (2006.01)
*G06F 13/00* (2006.01)
*H05K 5/00* (2006.01)
*H05K 7/00* (2006.01)

(52) U.S. Cl.
CPC .................................. *G06F 1/1632* (2013.01)
USPC ....................... 361/679.41; 710/303; 710/304

(58) Field of Classification Search
CPC ... G06F 1/1632; G06F 1/1616; G06F 1/1656; G06F 1/1635; G06F 1/1626; G06F 13/409; G06F 13/385; G06F 13/4081; G06F 1/203; G06F 1/3203; G06F 1/206
See application file for complete search history.

(56) References Cited

U.S. PATENT DOCUMENTS

| 2,620,061 A | 12/1952 | Uxa |
| 3,410,455 A | 11/1968 | Haas |
| 3,845,882 A | 11/1974 | Hass |
| 3,942,683 A | 3/1976 | Haas |
| 4,941,841 A | 7/1990 | Darden et al. |
| 4,966,305 A | 10/1990 | Hinterreiter |
| 5,283,714 A | 2/1994 | Tsai et al. |
| 5,313,596 A | 5/1994 | Swindler et al. |

(Continued)

OTHER PUBLICATIONS

International Search Report and Written Opinion of the International Searching Authority, International Patent Application No. PCT/US2013/073570, dated Apr. 18, 2014.

(Continued)

*Primary Examiner* — Hoa C Nguyen
*Assistant Examiner* — Xanthia C Cunningham
(74) *Attorney, Agent, or Firm* — Michael Best & Friedrich LLP

(57) ABSTRACT

A docking station for an electronic device that is contained within a case, in which the case includes a retractable connector access panel at least partially overlying a portion of a connector port of the electronic device, includes a base at least partially configured to support the electronic device. An electrical connector is coupled to the base and configured to receive the connector port of the electronic device. A retraction member is coupled to the base and configured to retract the connector access panel to at least partially expose the connector port during docking of the electronic device.

19 Claims, 39 Drawing Sheets

(56) References Cited

U.S. PATENT DOCUMENTS

| | | | |
|---|---|---|---|
| 5,434,743 A | 7/1995 | Hosoya et al. | |
| 5,454,080 A | 9/1995 | Fasig et al. | |
| 5,477,415 A | 12/1995 | Mitcham et al. | |
| 5,488,572 A | 1/1996 | Belmont | |
| 5,526,493 A | 6/1996 | Shu | |
| 5,535,093 A | 7/1996 | Noguchi et al. | |
| 5,552,959 A | 9/1996 | Penniman et al. | |
| 5,619,397 A | 4/1997 | Honda et al. | |
| 5,619,398 A | 4/1997 | Harrison et al. | |
| 5,633,782 A | 5/1997 | Goodman et al. | |
| 5,704,212 A | 1/1998 | Erler et al. | |
| 5,751,546 A | 5/1998 | Clark et al. | |
| 5,790,375 A | 8/1998 | Lee | |
| 5,823,809 A * | 10/1998 | Wakata | 439/157 |
| 5,956,399 A | 9/1999 | Whitley et al. | |
| 6,061,234 A * | 5/2000 | Broder et al. | 361/679.41 |
| 6,088,620 A | 7/2000 | Ninomiya et al. | |
| 6,097,810 A | 8/2000 | Hirai et al. | |
| 6,115,246 A | 9/2000 | Ohnishi | |
| 6,123,557 A | 9/2000 | Wang et al. | |
| 6,168,445 B1 * | 1/2001 | Seutschniker et al. | 439/157 |
| 6,229,893 B1 | 5/2001 | Chen | |
| 6,264,488 B1 * | 7/2001 | Helot et al. | 439/341 |
| 6,280,212 B1 | 8/2001 | Nguyen et al. | |
| 6,366,672 B1 | 4/2002 | Tsay | |
| 6,426,872 B1 | 7/2002 | Sutton et al. | |
| 6,427,959 B1 | 8/2002 | Kalis et al. | |
| 6,522,533 B1 | 2/2003 | Ikeuchi et al. | |
| 6,549,416 B2 | 4/2003 | Sterner et al. | |
| 6,585,212 B2 | 7/2003 | Carnevali | |
| 6,647,248 B1 | 11/2003 | Ortscheid | |
| 6,785,567 B2 | 8/2004 | Kato | |
| 6,837,435 B2 | 1/2005 | Kehoe et al. | |
| 6,856,506 B2 | 2/2005 | Doherty et al. | |
| 6,959,899 B2 | 11/2005 | Yeh | |
| 7,013,164 B2 | 3/2006 | Lin | |
| 7,014,486 B1 | 3/2006 | Wu et al. | |
| 7,017,243 B2 | 3/2006 | Carnevali | |
| 7,032,872 B2 | 4/2006 | Sullivan | |
| 7,062,300 B1 | 6/2006 | Kim | |
| 7,066,752 B2 | 6/2006 | Hsu et al. | |
| 7,103,397 B2 | 9/2006 | Oh | |
| 7,209,124 B2 | 4/2007 | Hunt et al. | |
| 7,273,203 B2 * | 9/2007 | Carnevali | 248/553 |
| 7,274,564 B2 | 9/2007 | Rossini | |
| 7,292,881 B2 | 11/2007 | Seil et al. | |
| 7,312,984 B2 | 12/2007 | Richardson et al. | |
| 7,345,871 B2 * | 3/2008 | Lev et al. | 361/679.27 |
| D585,897 S | 2/2009 | Carnevali | |
| 7,508,658 B2 | 3/2009 | Ling | |
| 7,523,528 B2 | 4/2009 | Carnevali | |
| 7,551,458 B2 | 6/2009 | Carnevali | |
| 7,556,521 B2 | 7/2009 | Abram | |
| 7,571,522 B2 | 8/2009 | Carnevali | |
| 7,647,676 B2 | 1/2010 | Carnevali | |
| 7,668,576 B2 | 2/2010 | Ellenbogen et al. | |
| 7,747,009 B2 | 6/2010 | Cullman | |
| 7,801,572 B2 | 9/2010 | Bury | |
| 7,817,414 B2 * | 10/2010 | Chou et al. | 361/679.41 |
| 7,823,844 B2 | 11/2010 | Carnevali | |
| 7,828,259 B2 | 11/2010 | Wang et al. | |
| 7,839,118 B2 | 11/2010 | Carnevali | |
| 7,911,779 B1 * | 3/2011 | Tarnoff | 361/679.43 |
| 7,930,004 B2 | 4/2011 | Seil et al. | |
| 7,930,006 B2 | 4/2011 | Neu et al. | |
| 7,931,494 B2 | 4/2011 | Long | |
| 7,970,443 B2 | 6/2011 | Wong et al. | |
| 7,978,466 B2 | 7/2011 | Lewandowski et al. | |
| 7,980,859 B2 | 7/2011 | Mizumura et al. | |
| 8,056,714 B2 | 11/2011 | Carnevali | |
| 8,061,516 B2 | 11/2011 | Carnevali | |
| 8,074,951 B2 | 12/2011 | Carnevali | |
| 8,091,850 B2 | 1/2012 | Carnevali | |
| 8,098,488 B2 * | 1/2012 | Lewandowski et al. | 361/679.41 |
| 8,176,603 B2 | 5/2012 | Carnevali | |
| 8,177,178 B2 | 5/2012 | Carnevali | |
| 8,182,426 B2 | 5/2012 | Zhao et al. | |
| 8,201,788 B2 | 6/2012 | Carnevali | |
| 8,780,546 B2 * | 7/2014 | Zhou | 361/679.41 |
| 2002/0097554 A1 | 7/2002 | Hardin et al. | |
| 2003/0201970 A1 * | 10/2003 | Liu | 345/156 |
| 2004/0120112 A1 | 6/2004 | Mullen et al. | |
| 2005/0028325 A1 | 2/2005 | Carnevali | |
| 2006/0026807 A1 | 2/2006 | Carnevali | |
| 2006/0098407 A1 * | 5/2006 | Hsu | 361/686 |
| 2006/0104018 A1 | 5/2006 | Tracy et al. | |
| 2007/0073952 A1 * | 3/2007 | Tsai et al. | 710/303 |
| 2008/0137285 A1 * | 6/2008 | Chuang | 361/686 |
| 2008/0166896 A1 * | 7/2008 | Choi et al. | 439/43 |
| 2008/0203260 A1 | 8/2008 | Carnevali | |
| 2008/0239658 A1 * | 10/2008 | Chou et al. | 361/686 |
| 2008/0270664 A1 * | 10/2008 | Carnevali | 710/303 |
| 2009/0009957 A1 * | 1/2009 | Crooijmans et al. | 361/686 |
| 2009/0032665 A1 | 2/2009 | Smith, Jr. et al. | |
| 2009/0212189 A1 * | 8/2009 | Carnevali | 248/346.04 |
| 2009/0213536 A1 * | 8/2009 | Lewandowski et al. | 361/679.43 |
| 2010/0188808 A1 * | 7/2010 | Howarth et al. | 361/679.41 |
| 2010/0301183 A1 | 12/2010 | Carnevali | |
| 2011/0095159 A1 | 4/2011 | Carnevali | |
| 2011/0095724 A1 | 4/2011 | Byrne | |
| 2011/0128689 A1 * | 6/2011 | Lewandowski et al. | 361/679.02 |
| 2011/0164375 A1 | 7/2011 | Hayashida et al. | |
| 2011/0266230 A1 | 11/2011 | Carnevali | |
| 2012/0045931 A1 | 2/2012 | Carnevali | |
| 2012/0045932 A1 | 2/2012 | Carnevali | |
| 2014/0021189 A1 * | 1/2014 | Yue | 219/211 |

OTHER PUBLICATIONS

PCTUS2012/044437 International Search Report and Written Opinion dated Sep. 17, 2012.

Melard Technologies SIDEARM All-Terrain Handheld PC™ Docking Station—Available at least as early as Dec. 2002.

Ledco CF-28 Docking Station—Available at least as early as May 2003.

* cited by examiner

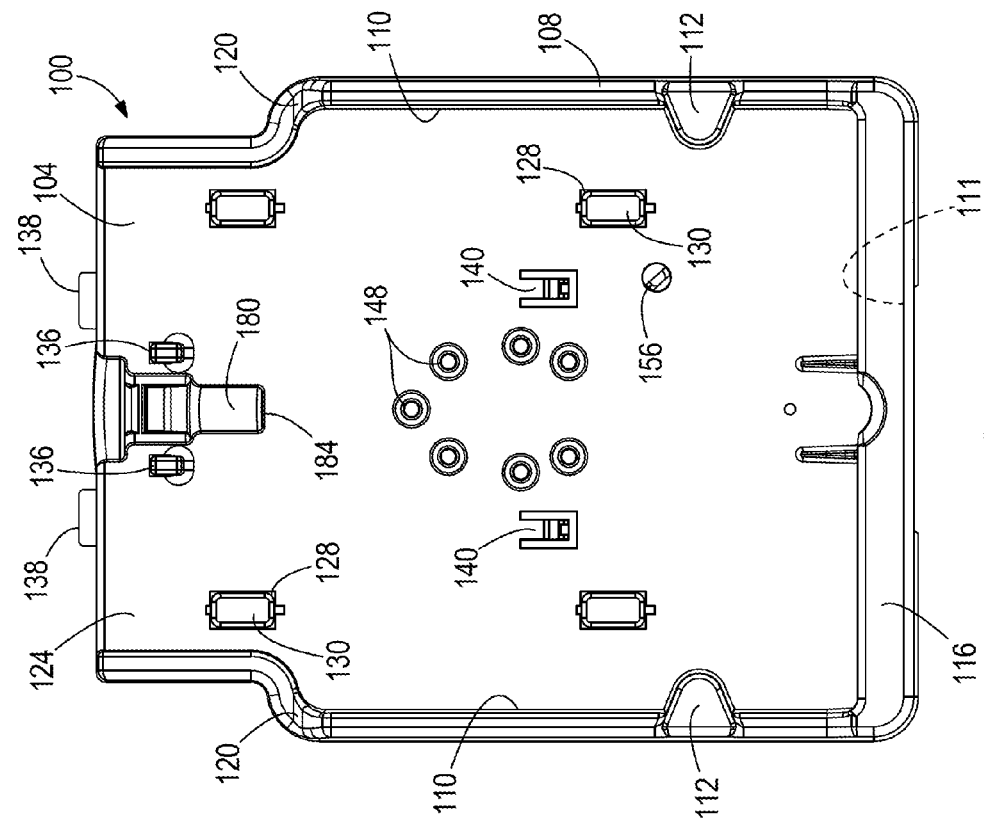
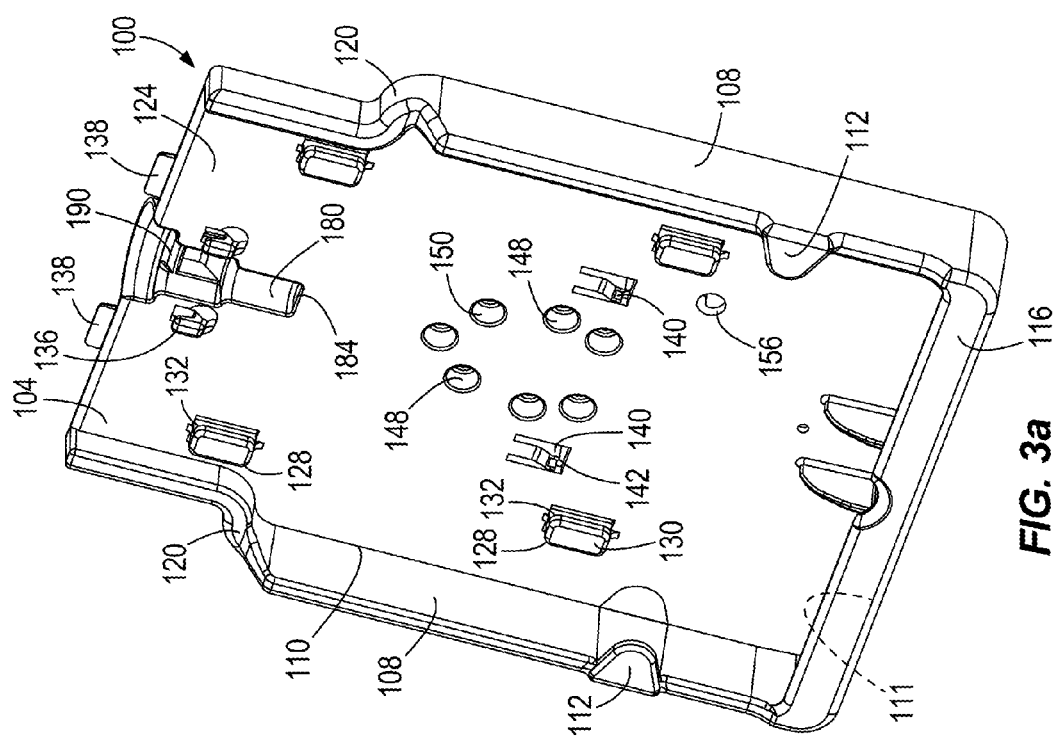

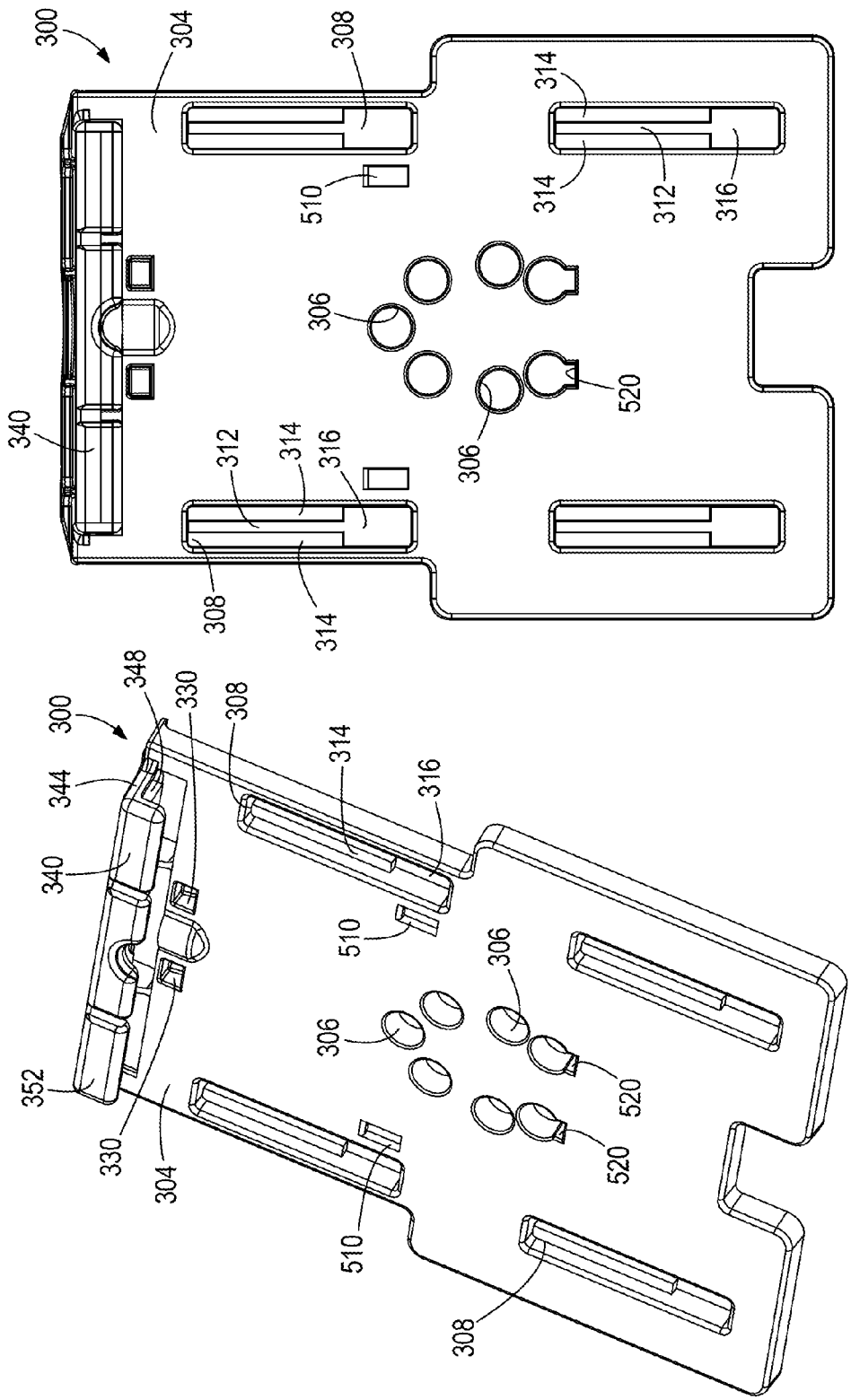

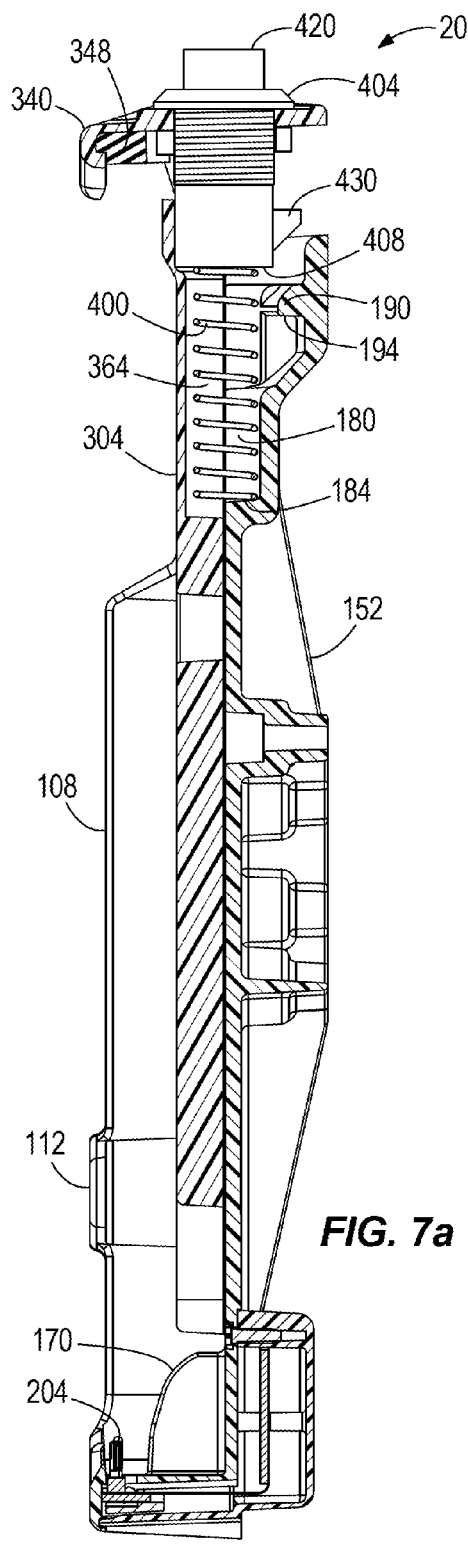
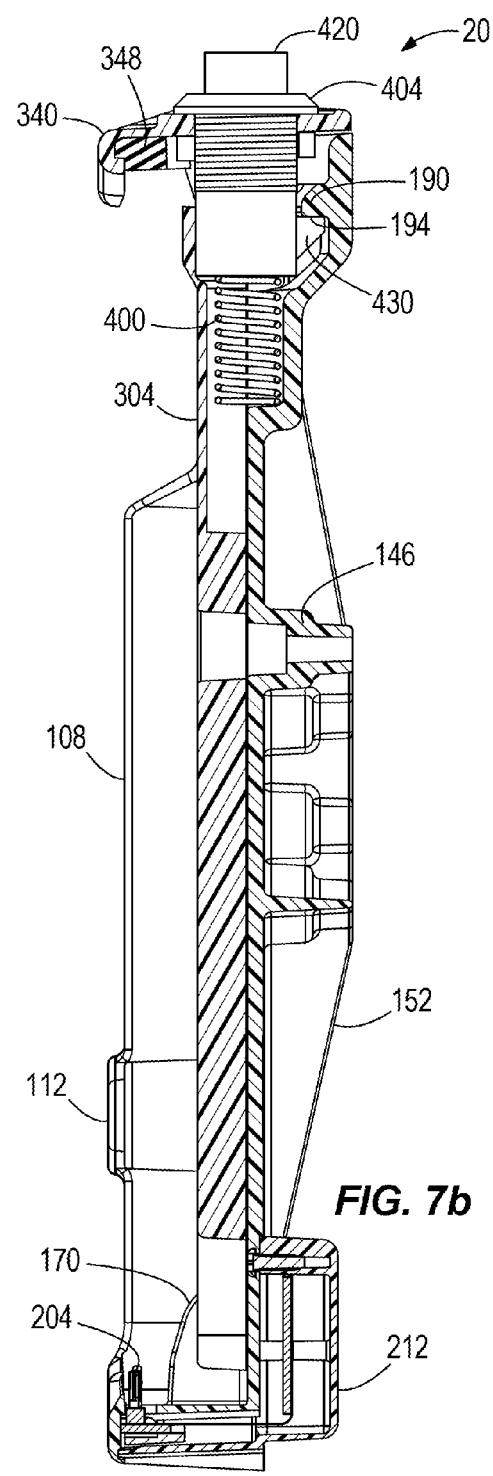
FIG. 7a
FIG. 7b

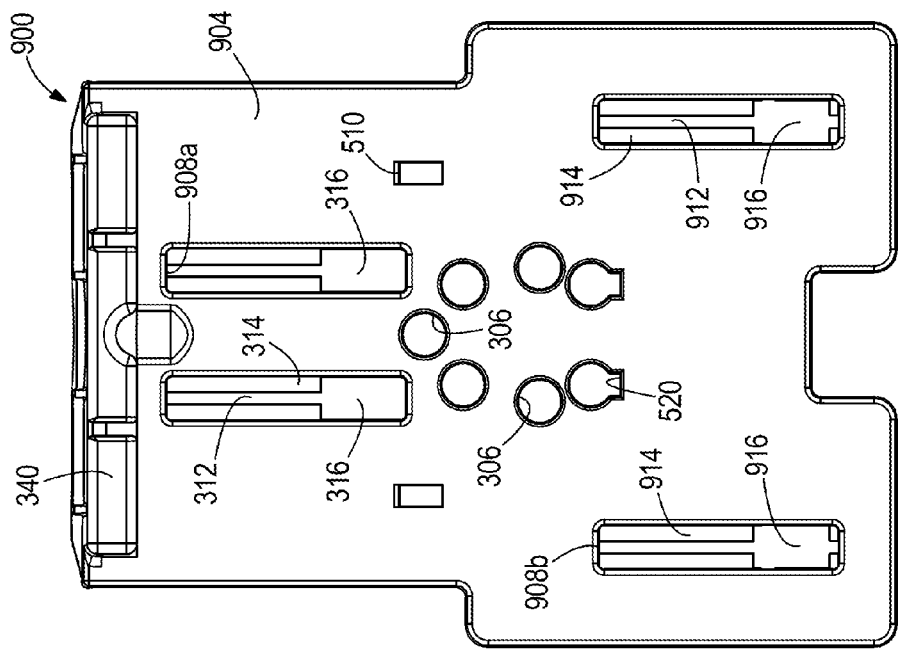
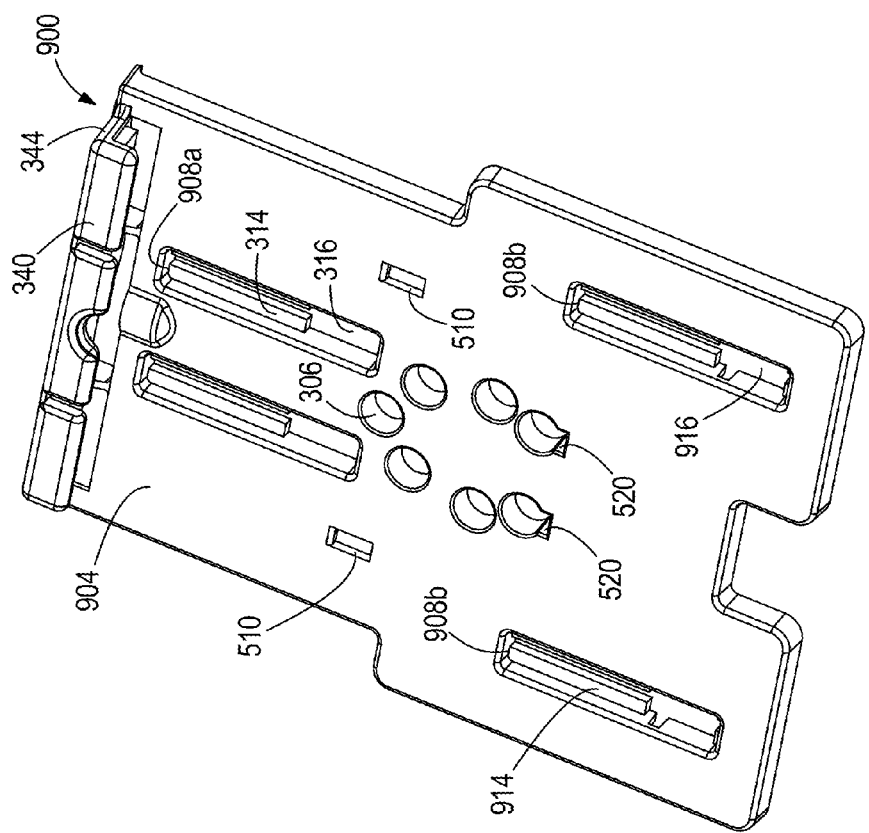

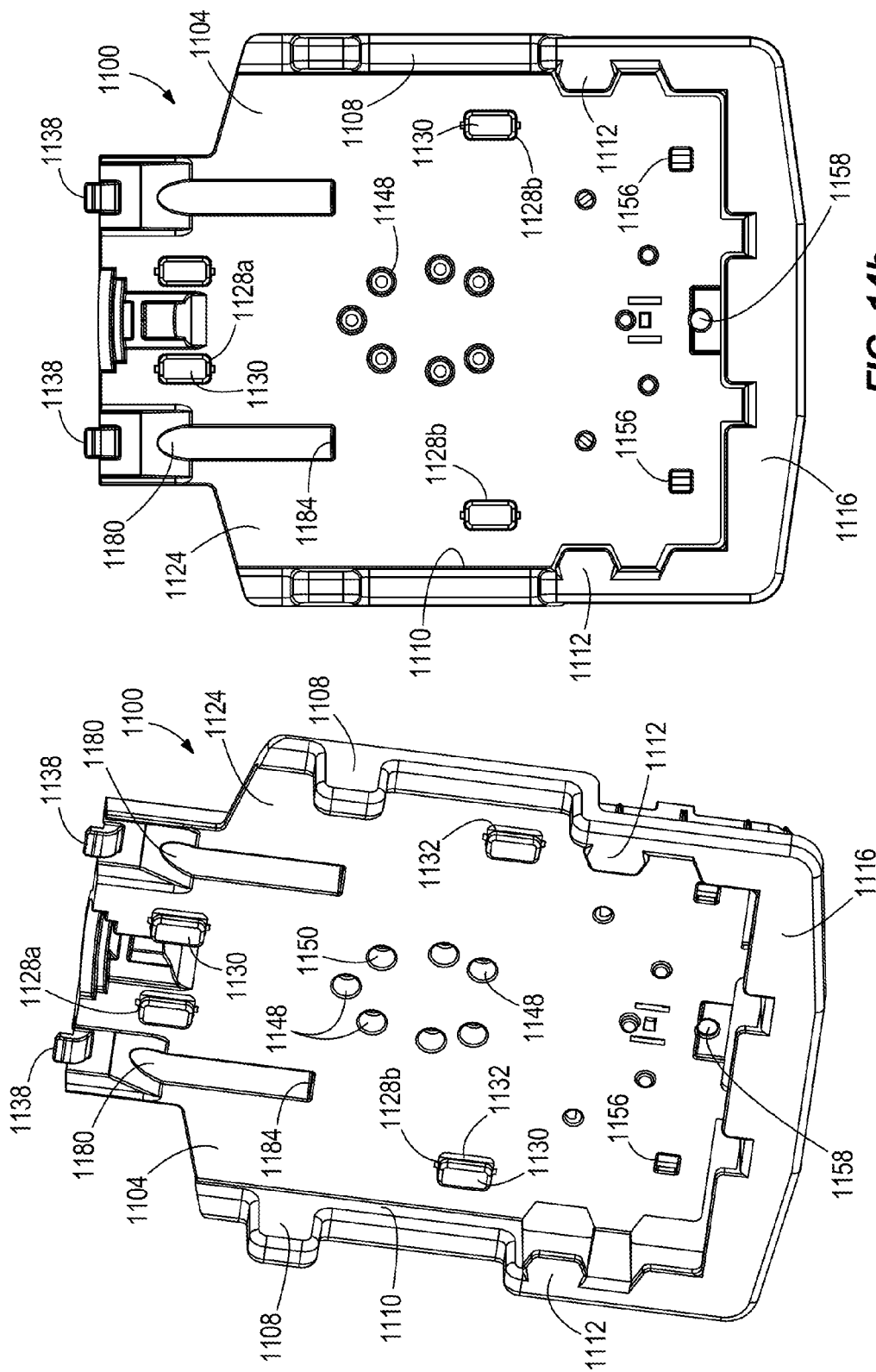

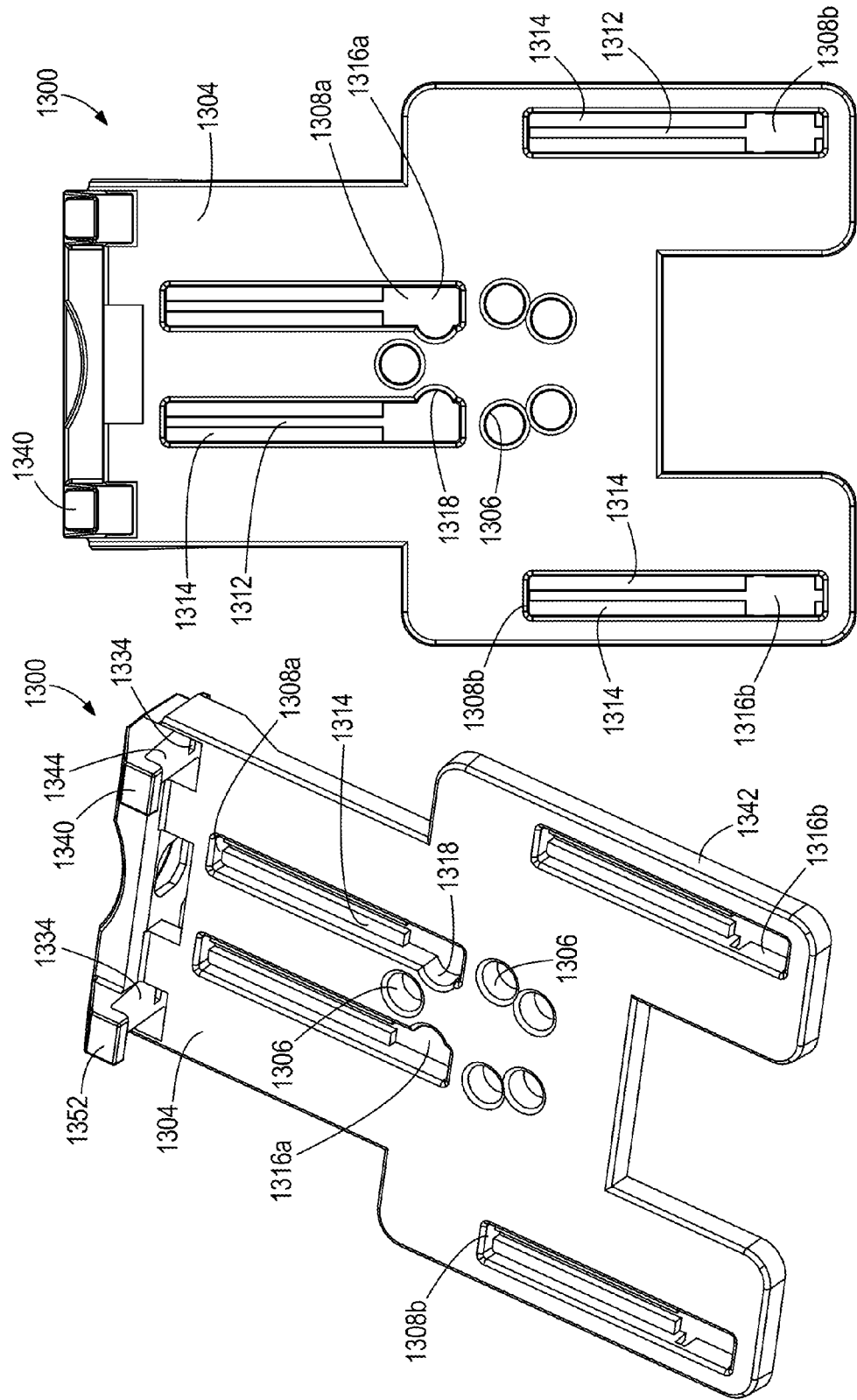

US 8,929,065 B2

DOCKING STATION WITH RUGGEDIZED CASE

BACKGROUND

The present invention relates to docking stations for electronic devices.

Tablet-style electronic devices, such as tablet personal computers ("tablet computers"), allow users to retain much of the functionality and mobile computing capability of traditional laptop computers in a smaller and more easily transportable design. Third party manufacturers continue to make available a wide variety of rugged cases within which users can secure their tablet computers to permit operation in harsh environments, including inclement weather conditions and circumstances with an increased chance of dropping the computer.

SUMMARY

A dock, or docking station, provides a convenient way for a user to securely "park" a tablet computer in one location at a desired viewing position and can include one or more connections to peripheral equipment.

In one embodiment, a docking station for an electronic device that is contained within a case, in which the case includes a retractable connector access panel at least partially overlying a portion of a connector port of the electronic device, includes a base at least partially configured to support the electronic device. An electrical connector is coupled to the base and configured to receive the connector port of the electronic device. A retraction member is coupled to the base and configured to retract the connector access panel to at least partially expose the connector port during docking of the electronic device.

In one embodiment, a docking station for an electronic device that is contained within a case, in which the case includes a retractable connector access panel at least partially overlying a portion of a connector port of the electronic device, includes a base at least partially configured to support the electronic device. A slide is translatably coupled to the base and adjustable from a retracted position to an extended position and includes a cradle for securing the electronic device to the base. A retraction member is coupled to the base and configured to retract the connector access panel to at least partially expose the connector port during docking of the electronic device.

Other aspects of the invention will become apparent by consideration of the detailed description and accompanying drawings.

BRIEF DESCRIPTION OF THE DRAWINGS

FIG. 2b is rear perspective view of the docking station of FIG. 2a.

FIG. 3a is a front perspective view of the base of the docking station of FIG. 1.

FIG. 3b is a front view of the base of FIG. 3a.

FIG. 3c is a rear perspective view of the base of FIG. 3a.

FIG. 4d is a section view taken along line 4d-4d of FIG. 4a.

FIG. 5a is a front perspective view of the slide of the docking station of FIG. 1.

FIG. 5b is a front view of the slide of FIG. 5a.

FIG. 5c is a rear perspective view of the slide of FIG. 5a.

FIG. 7a is a section view of the docking assembly in an extended position taken along line 7a-7a of FIG. 2c.

FIG. 7b is a section view of the docking assembly in a retracted position taken along line 7b-7b of FIG. 2a.

FIG. 9a is a front perspective view of the base of an alternative docking station.

FIG. 9b is a front view of the base of FIG. 9a.

FIG. 10a is a front perspective view of the slide of the alternative docking station.

FIG. 10b is a front view of the slide of FIG. 10a.

FIG. 10c is a rear perspective view of the slide of FIG. 10a.

FIG. 10d is a perspective view of an insert block for use with the slide of FIG. 10a.

FIG. 10e is a partial perspective view of the insert block disposed within the slide of FIG. 10a.

FIG. 13b is a rear perspective view of the docking station of FIG. 13a.

FIG. 14a is a front perspective view of the base of the docking station of FIG. 12.

FIG. 14b is a front view of the base of FIG. 14a.

FIG. 14c is a rear perspective view of the base of FIG. 14a.

FIG. 15d is a section view taken along line 15d-15d of FIG. 13a.

FIG. 16a is a front perspective view of the slide of the docking station of FIG. 12.

FIG. 16b is a front view of the slide of FIG. 16a.

FIG. 16c is a rear perspective view of the slide of FIG. 16a.

FIG. 18b is a section view of the docking assembly in a retracted position taken along line 18b-18b of FIG. 13a.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
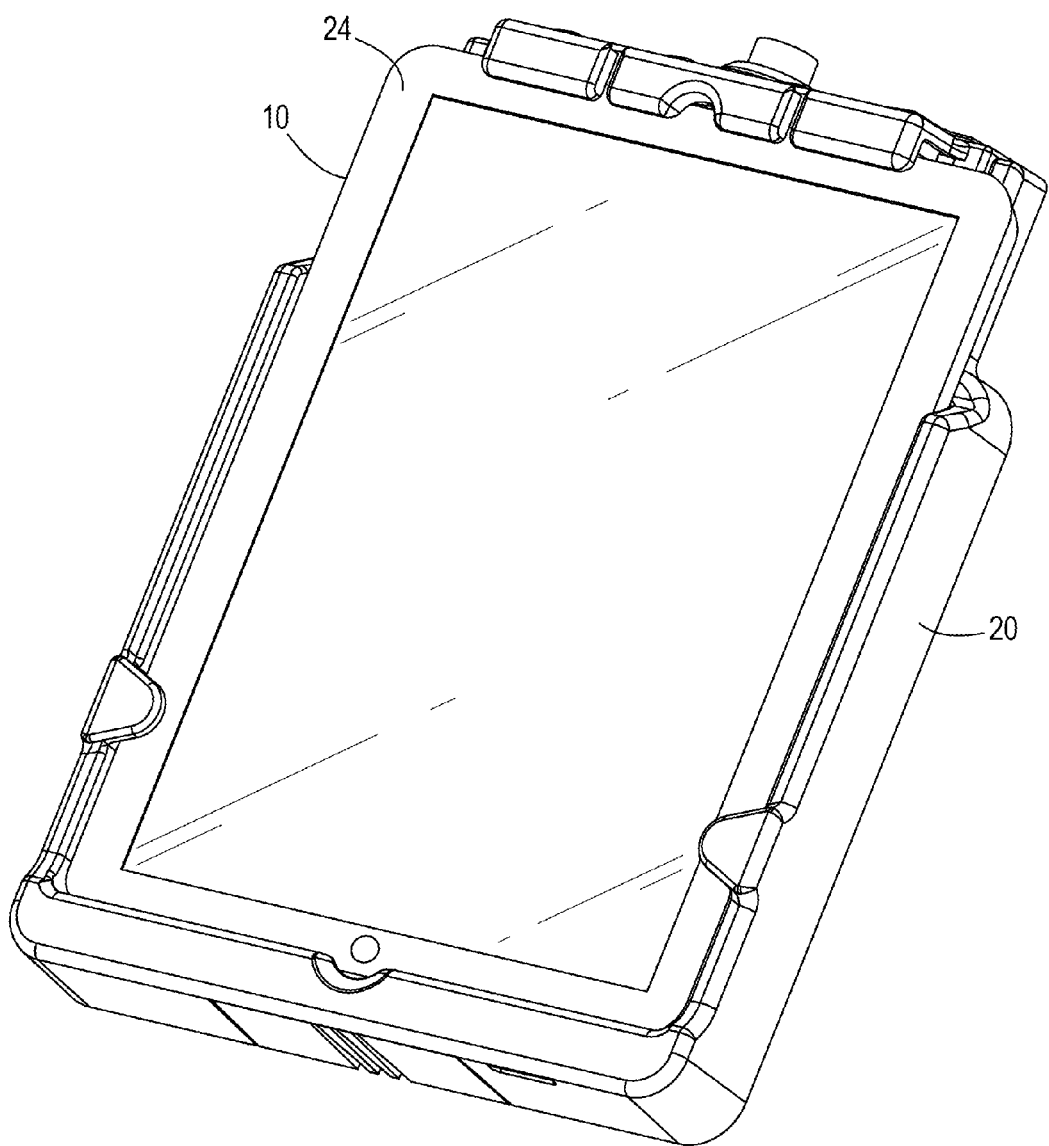
FIG. 1 is a perspective view showing a tablet computer docked in a docking station embodying the invention.

FIG. 1 illustrates a tablet computer 10 docked in a docking station 20 of the present invention. The docking station 20 may be configured for a particular brand of tablet computer and the tablet computer 10 may be, for example, an Apple iPad® or an Apple iPad 2®. The docking station 20 is operable to support and electrically couple to the tablet computer 10 when the tablet computer 10 is not being transported or carried by hand. The docking station 20 can be mounted virtually anywhere the tablet computer 10 might be used, including in a room or in a vehicle. Additionally, the docking station 20 can be mounted on a movable cart, desk, or the like to render the tablet computer 10 mobile even when docked in the docking station 20. The docking station 20 can also be mounted on a stationary wall. Various mounting hardware (not shown) can be used to secure the docking station 20 in the appropriate manner to a support surface, for example, a pedestal mount. A mounting configuration for the docking station 20 will be more fully detailed below (see FIGS. 3a-3c, 5a-5b).

Figure 2A:
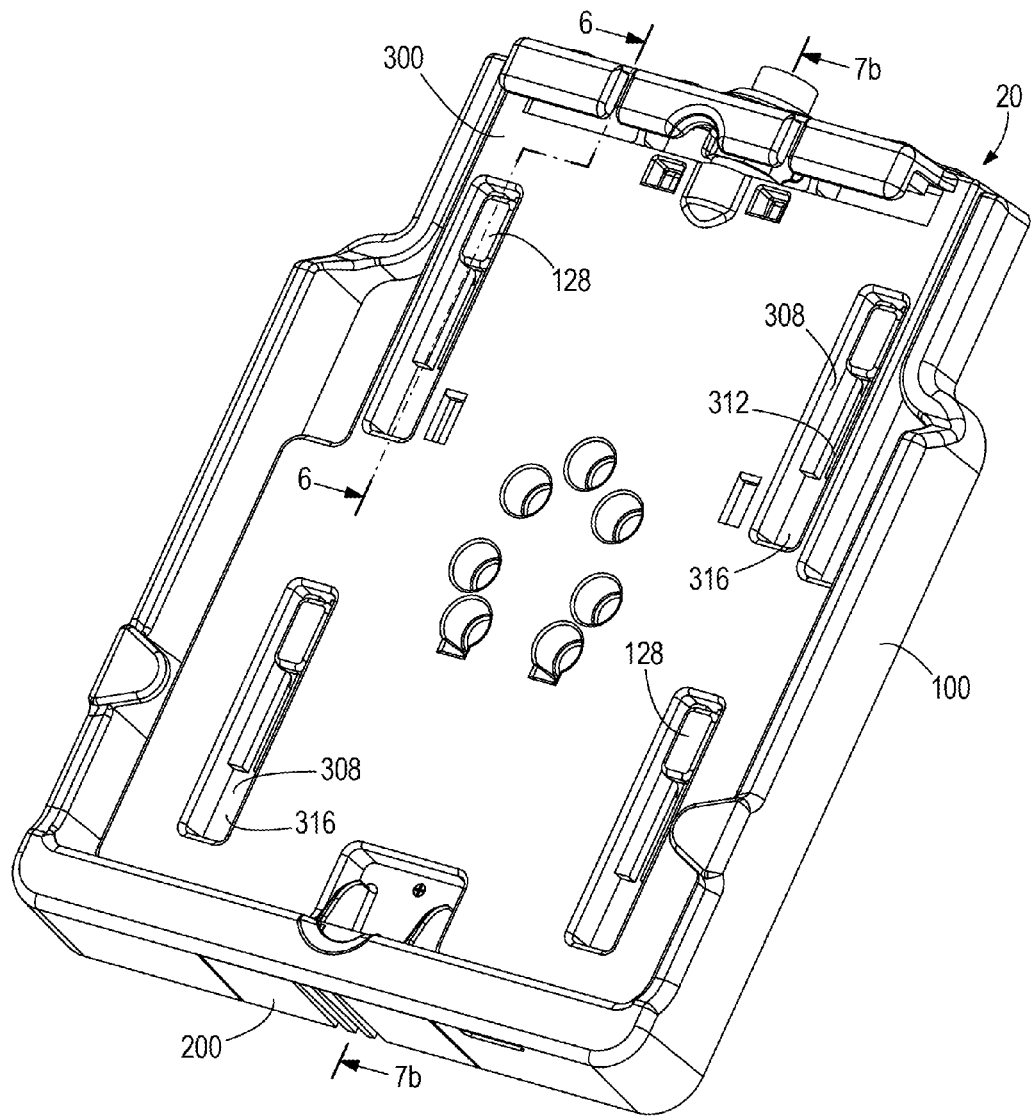
FIG. 2a is a front perspective view of the docking station of FIG. 1 in a retracted position.
Figure 2B:
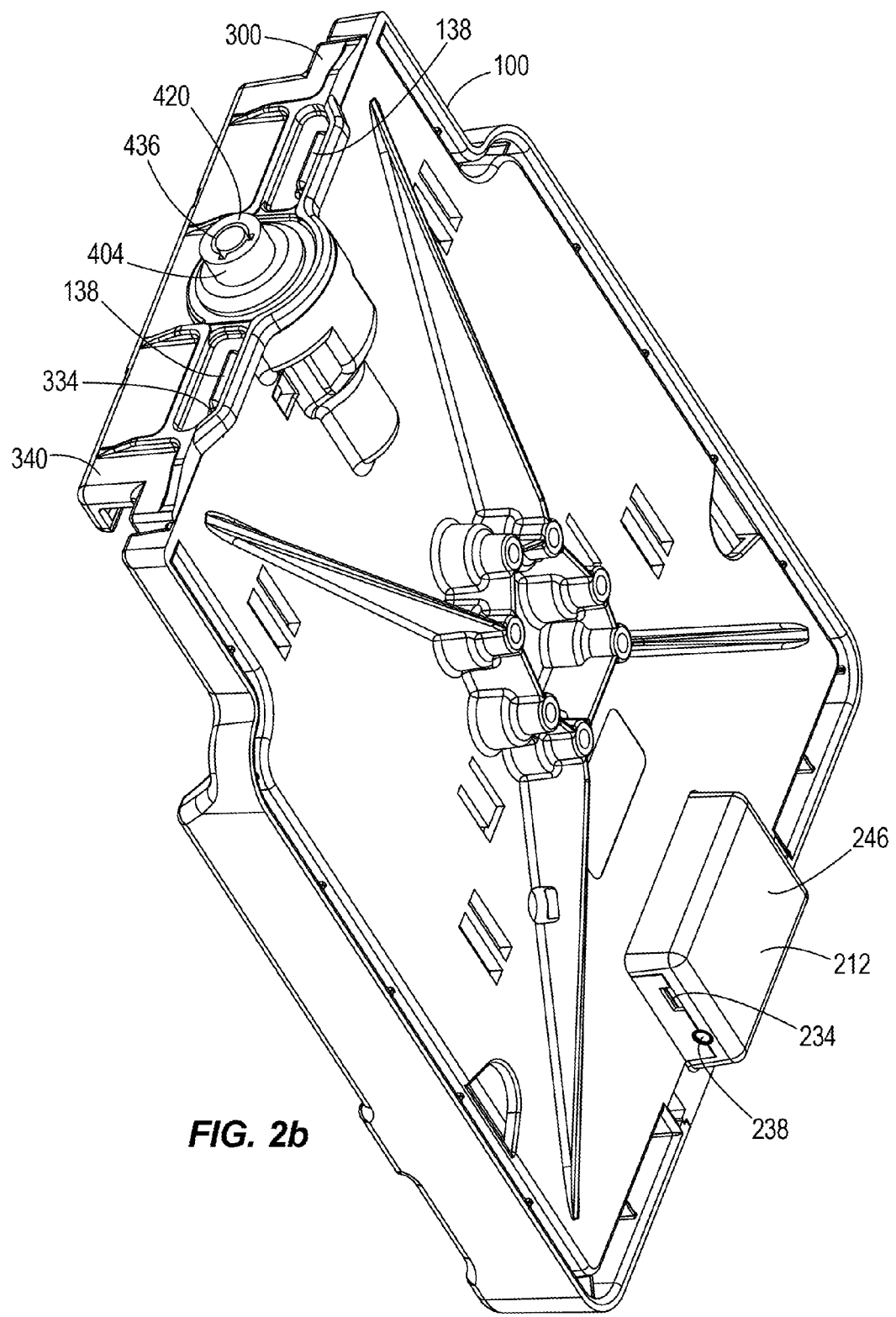
Figure 2C:
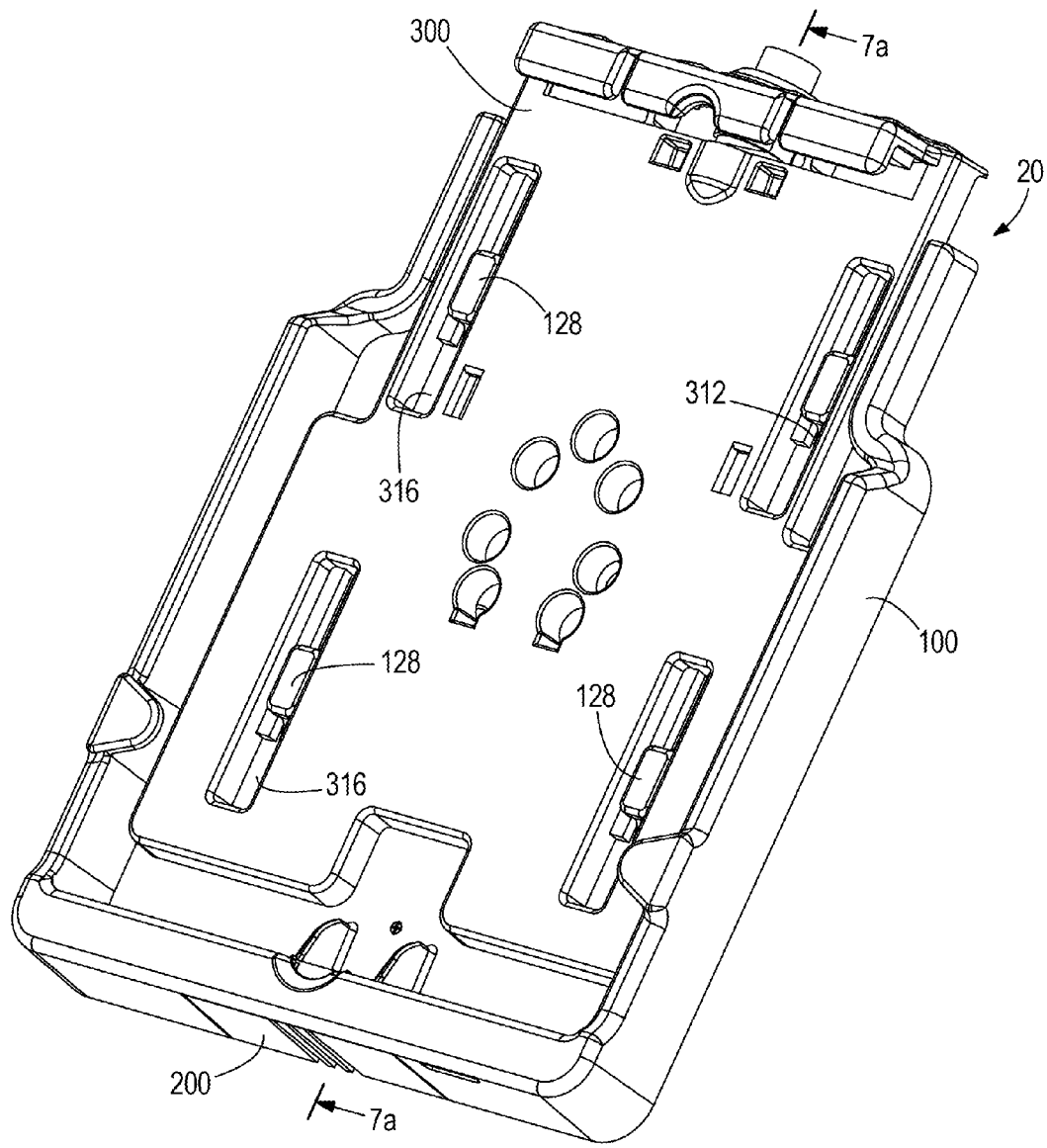
FIG. 2c is a front perspective view of the docking station of FIG. 1 in an extended position.
Figure 2D:
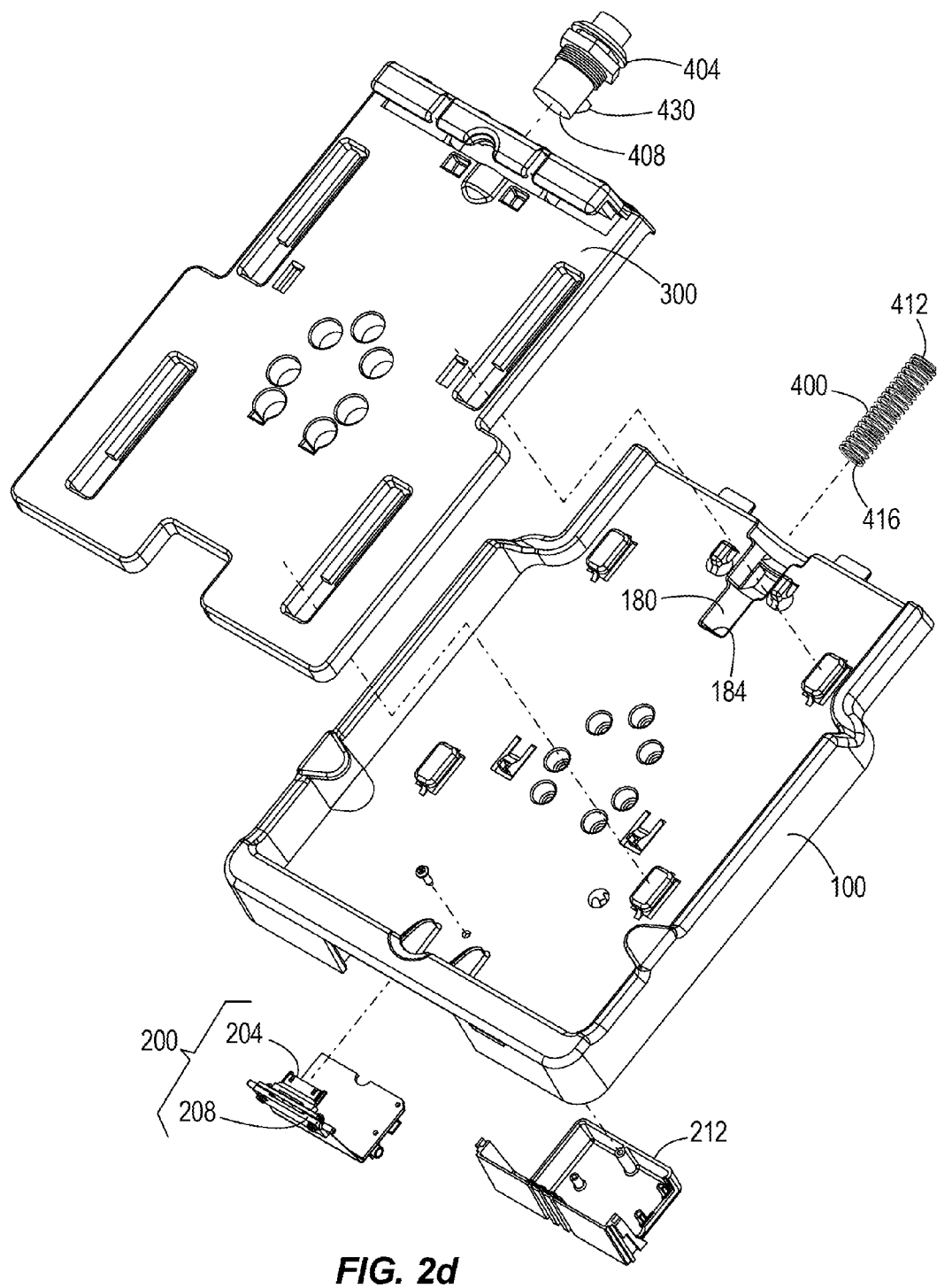
FIG. 2d is an exploded view of the docking station of FIG. 1.

Referring to FIGS. 2a and 2c, the docking station 20 is shown without a tablet computer 10. The docking station 20 includes a base 100, a connector assembly 200, and a slide 300. As will be more fully described below, the slide 300, in an extended position (FIG. 2c), allows for the insertion of the tablet computer 10 into the docking station 20, after which it is retracted (FIG. 2a) to secure the tablet computer 10. Referring to FIG. 2d, the connector assembly 200 includes a connector 204, a carrier 208, and a cover 212. A biasing spring 400 biases the slide 300 in the extended position, and a lock mechanism 404 prevents unauthorized withdrawal of the tablet computer 10 from the docking station 20, as will also be further detailed below. The base 100, slide 300, carrier 208, and cover 212 are primarily plastic (e.g., polycarbonate resin), but in other embodiments could be primarily metal or other suitable materials. The docking station 20 also includes some electrical components and steel hardware. Other materials and methods of manufacture do not limit the docking station 20 as presently described.

Figure 3C:
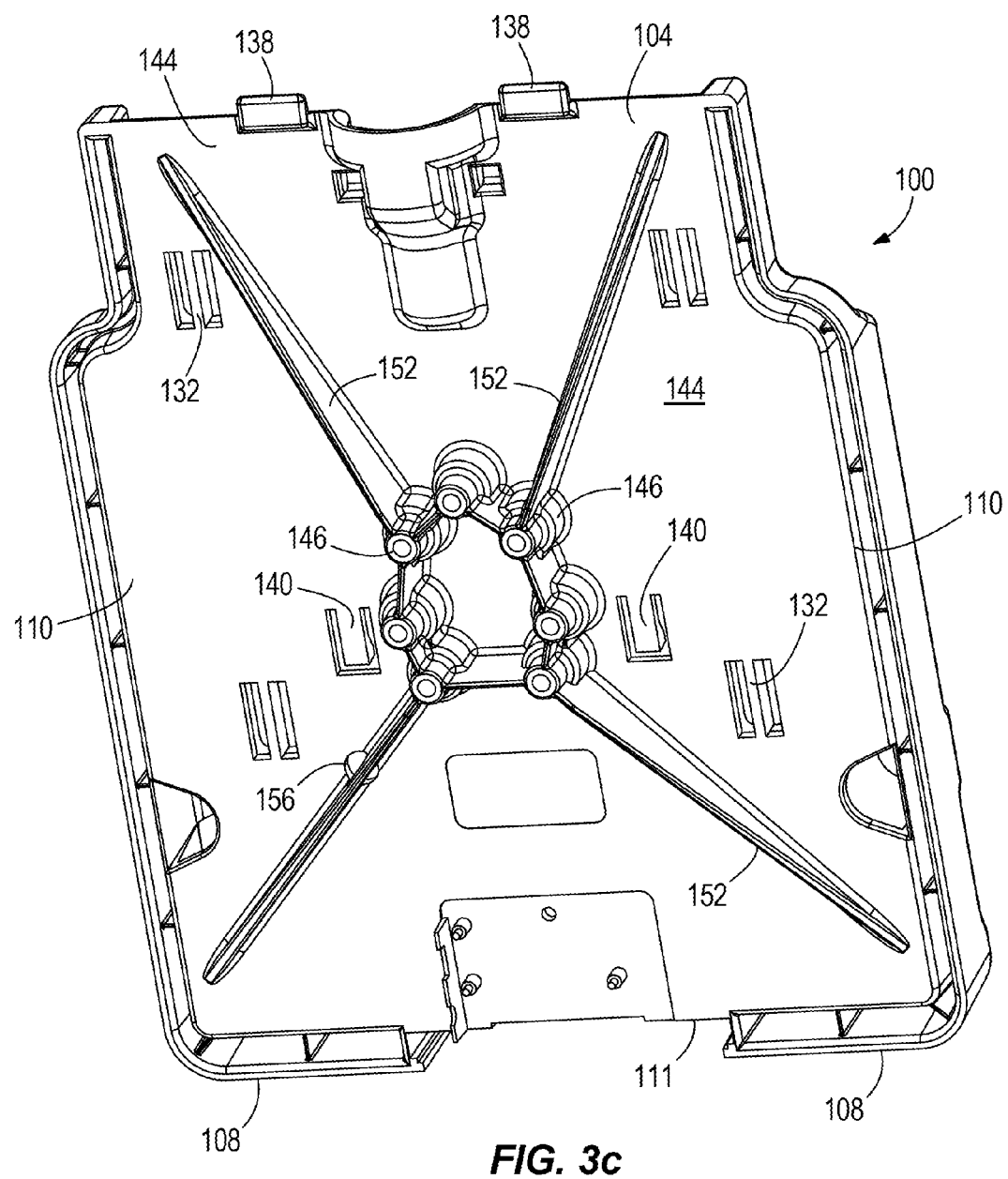

Referring to FIGS. 3a-3c, the base 100 includes a panel 104 having a front face 124. Extending frontwardly along a partial periphery of the panel 104 are opposing walls 108. As used herein and in the appended claims, the terms "upper", "lower", "top", "bottom", "front", "back", and other directional terms are not intended to require any particular orientation, but are instead used for purposes of description only. Specifically, the walls 108 are located predominantly along the lateral sides 110 of the panel 104 and extend partially along the bottom side 111 of the panel 104, as best shown in FIG. 3c. The walls 108 assist in aligning and retaining both the tablet computer 10 upon insertion and the slide 300 upon extension and retraction, as will be further described. Each wall 108 includes a portion 120 that dips rearwardly and inwardly such that the tablet computer 20 can be grasped at a top corner 24 (see FIG. 1) for easier withdrawal from the docking station 20. Outer tabs 112 projecting inwardly from the walls 108 and a bottom lip 116 extending across the bottom of the base 100 are both substantially parallel to the front face 124 and provide additional support to the inserted tablet computer 10, as well as restraint from frontward movement.

Extending from the front face 124 of the panel 104 are four "T" tabs 128. Each "T" tab 128 includes a flared portion 130 that adjoins and is integral with the panel 104 through a neck portion 132. The "T" tabs 128 engage the slide 300 and prevent frontward movement of the slide 300 away from the base 100 while allowing translation between the extended position and the retracted position, as will be further described (see FIGS. 5a-5b). A pair of locking hooks 136 and a pair of locking projections 138 also cooperate with corresponding structure in the slide 300 (see FIG. 5c) to provide additional resistance to frontward movement of the slide 300 in the retracted position, as further detailed below. Also formed integrally with the panel 104 are two locking members or tabs 140. The locking tabs 140 serve as cantilever springs operable upon assembly of the slide 300 to the base 100 and include edges 142 that protrude frontwardly from the front face 124 for engagement with an opposing ridge (see FIG. 5c, to be described below) in the slide 300 to limit the range of translation of the slide 300 during extension.

Referring to FIGS. 3a and 3c, interconnected and integrated fastening members 146 projecting from a rear face 144 of the panel 104 define universal mounting holes 148 that are configured for the coupling of a stand or other device such that the docking station 20 can itself be mounted on another surface. In particular, the mounting holes 148 present a AMPS-NEC compatible hole pattern, which is known to those of skill in the art, for the attachment of a mounting plate, such as for a pedestal mount (not shown). As shown in FIG. 3a, the mounting holes 148 are countersunk such that hardware, for example screws, can be installed flush with or below the front face 124. The inside surface 150 of each mounting hole 148 is circular and smooth such that unfastened screws can rotate freely within the holes 148. Referring to FIG. 3c, struts 152 distribute pressure from the weight of the docking station 20 components and from additional external forces on the docking station 20 more uniformly, decreasing bending and other stresses that could otherwise develop throughout the docking station 20. An orifice 156 provides strain relief to external accessory cables associated with the connector assembly 200 (see FIG. 4b).

Figure 4A:
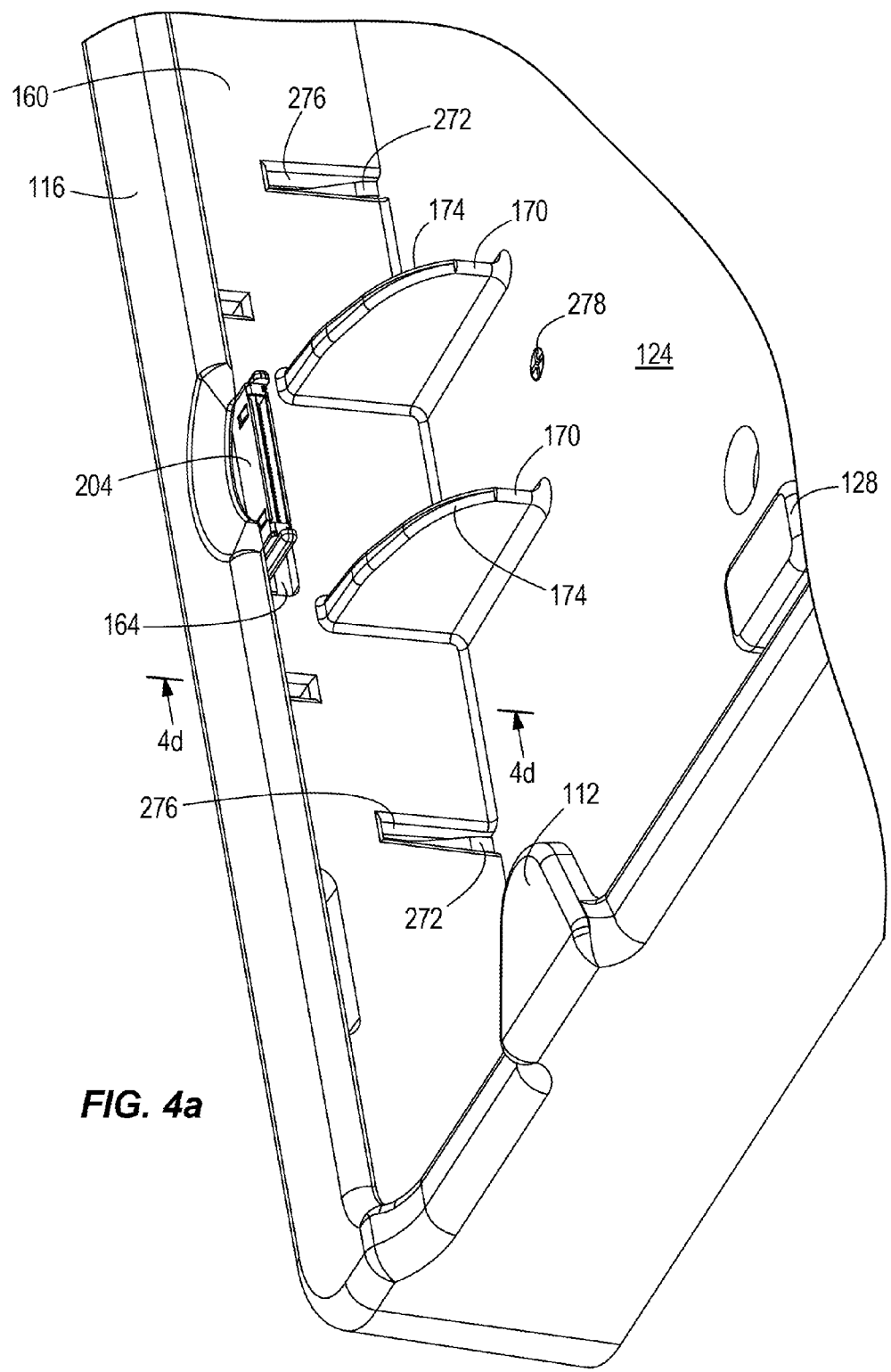
FIG. 4a is an enlarged partial view of a bottom portion of the docking station of FIG. 1 showing the connector of the connector assembly.

Referring now to FIG. 4a, an adjacent or bottom face 160 (i.e., a bottom face in the illustrated orientation, but could also be a side face or top face depending on orientation—therefore adjacent face 160 can also be used) is positioned between and substantially orthogonal to the front face 124 and the bottom lip 116. Extending through an aperture 164 in the bottom face 160 is the connector 204 of the connector assembly 200. The connector 204 is adaptable to electrically connect to a mating connector 214 (see FIG. 4d) positioned at the bottom of the tablet computer 10. For example, the iPad® or iPad 2® tablet computers are manufactured with a 30 pin connector that can carry multiple electrical signals, such as audio output, data, and power. In this instance, the connector 204 would electrically correspond to the connector 214 of the tablet computer 10, i.e., a mating 30 pin connector. As used herein and in the appended claims, the term "connector" and "electrical connector" can also include connectors that only pass radio frequencies, as opposed to the more mechanical, 30 pin connector illustrated. A pair of guide ribs 170 arcuately extend normally between the front face 124 and the adjacent orthogonal bottom face 160, as illustrated, though the use of one guide rib 170 or more than two guide ribs 170 are within the scope of the invention. The guide ribs 170 are sized and configured such that during insertion of the tablet computer 10 into the docking station 20, a curved edge portion 174 engages an advancing bottom surface of the tablet computer 10 to facilitate alignment of the connector 204 with the connector of the tablet computer 10.

Figure 4B:
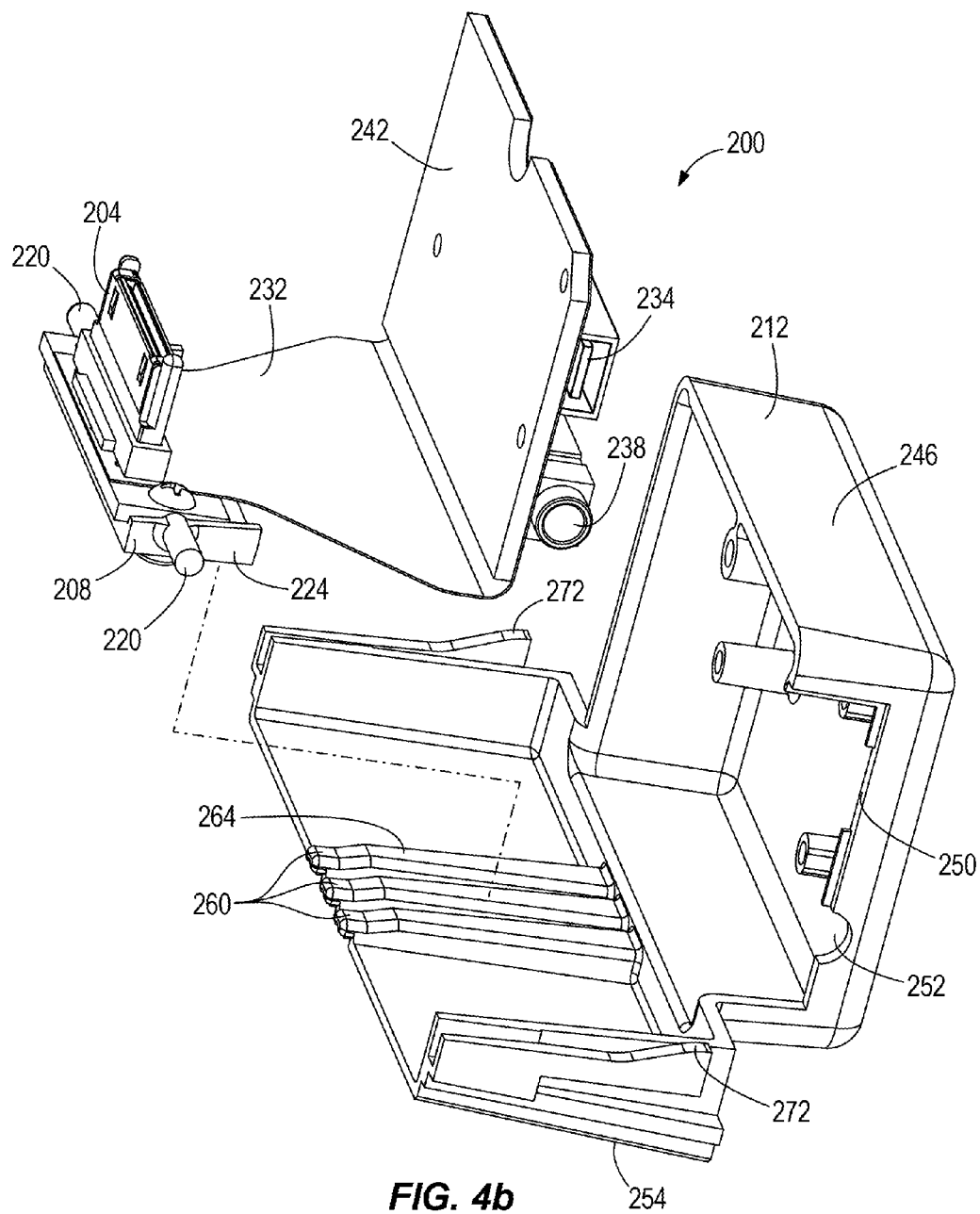
FIG. 4b is an exploded view of the connector assembly.
Figure 4C:
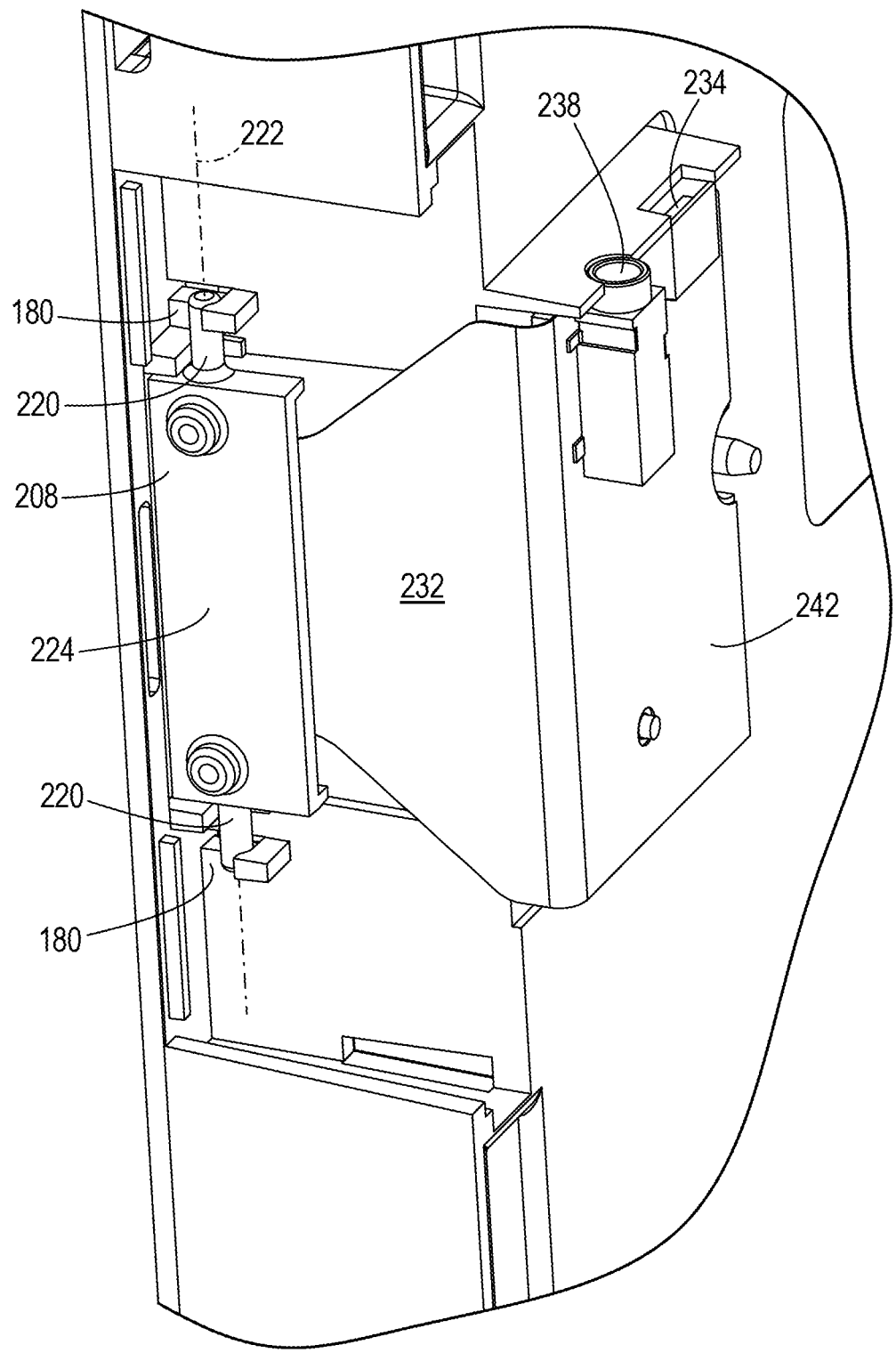
FIG. 4c is an enlarged partial view of portions of the connector assembly of FIG. 4b within the docking station.

FIG. 4b shows the connector assembly 200 apart from the base 100. As noted, the connector assembly 200 includes the connector 204, the carrier 208, and the cover 212. The connector 204 is fixed to the carrier 208. The carrier 208 includes pivot projections 220 mounted to a carrier body 224. Referring to FIG. 4c, the pivot projections 220 snap into and are rotatable within seats 180 formed within the underside of the base 100. The inserted pivot projections 220 define a pivot axis 222 that is parallel to the front face 124 of the base 100 and about which the carrier 208 and affixed connector 204 rotate. A flexible pad 226 is positioned between a top surface 228 of the carrier body 224 and a bottom surface 230 of the bottom face 160. The pad 226 can be constructed of any suitable flexible material, such as rubber, and biases the connector to a certain position for alignment, as will be further detailed below. Referring to FIGS. 4b-4c, a flex cable 232 transmits electrical signals from the connector 204 to one or more external connectors 234, 238 (e.g., input/output connections) fixed to an attachment plate 242. Because the flex cable 230 is flexible, rotation of the carrier 208 and the connector 204 is not transmitted to the attachment plate 242. In the illustrated embodiment the external connector 234 is a Micro USB connector and the external connector 238 is 3.5 mm audio output connector, though other external connectors are within the scope of the presently described invention, such as video connectors, serial data connectors, or other connectors associated with a particular tablet computer.

Figure 4D:
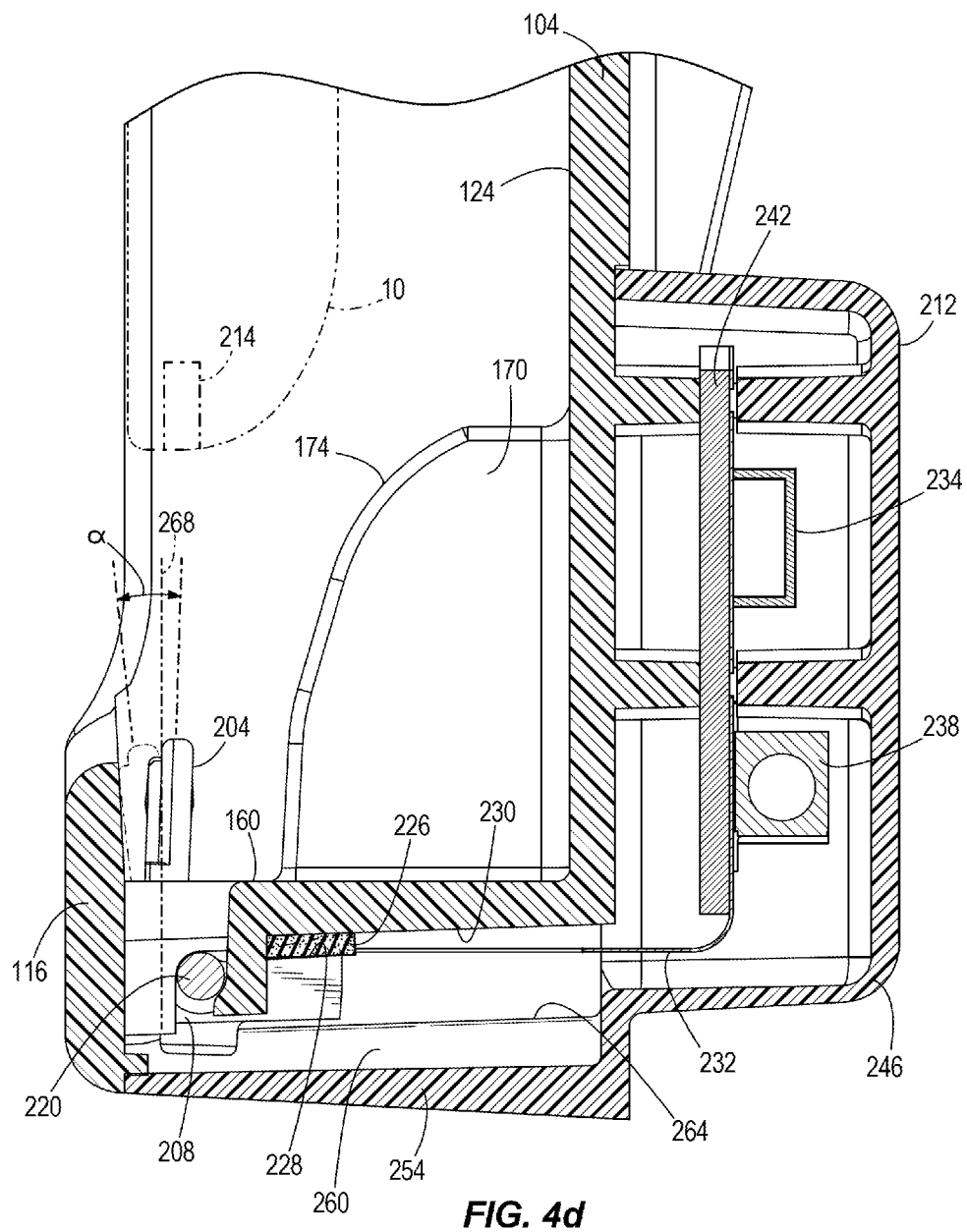

The cover 212 includes an enclosure 246 that generally surrounds the attachment plate 242 and external connectors 234, 238, from the rear side of the base 100 (see FIG. 2b). Referring to FIG. 4b, the enclosure 246 has openings 250, 252, through which the contact portions of the external connectors 234, 238, pass for coupling to electronic accessories (not shown). A bottom portion 254 of the cover 212 positioned along the underside of the base 100 protects the pivoting carrier 208 and includes a plurality of blocking ribs 260. Three blocking ribs 260 are illustrated, although fewer than three or more than three are within the scope of the invention. As shown in FIG. 4d, the blocking ribs 260 are contoured to limit the extent of clockwise and counterclockwise rotational travel of the carrier 208 (and the connector 204) by presenting a top surface 264 against which the carrier 208 would impact if rotated too far. In the illustrated embodiment, the connector 204 can pivot within an angle range a of about −10° to about +3° relative to a vector 268 normal to the bottom surface 160, as shown in phantom. In other constructions, the connector 204 can pivot within an angle range a from less than −10° to greater than +3° relative to the vector 268. In the illustrated embodiment, without a connected tablet computer 10, the connector 204 is biased at an angle of approximately +3° from the vector 268 due to the effect of the pad 226 previously described. After the connector 204 is engaged with the tablet computer 10, the connector 204 is generally situated parallel to the vector 268. Referring to FIGS. 4a and 4b, the cover 212 includes snap tabs 272 that lock into place via a snap fit adjacent to corresponding slots 276 located in the bottom surface 160. A single fastener 278 (see FIG. 4a) secures the cover 212 to the base 100.

Referring to FIG. 5a, the slide 300 includes a generally front planar face 304. Rectangular slots 308 engage and functionally translate over the previously described "T" tabs 128 of the base 100. The rectangular slots 308 each include a narrow upper portion 312, defined by rails 314, and a wider bottom portion 316. Specifically, the upper portion 312 slides about the neck portion 132 of each "T" tab 128 during retraction and extension of the slide 300, as can be seen in FIGS. 2a and 2c, and as will be further described below. While engaged, contact between the flared portion 130 and the rails 314 assists in preventing frontward movement that would separate the slide 300 from the base 100. Contact between the neck portion 132 and the rails 314 prevents lateral movement between the slide 300 and the base 100. The bottom portion 316, as will be further described, is sized to accommodate the flared portion 130 during assembly of the slide 300 to the base 100. In other embodiments, the tabs 128 could be on the slide 300 while the slots could be on the base 100.

Figure 5C:
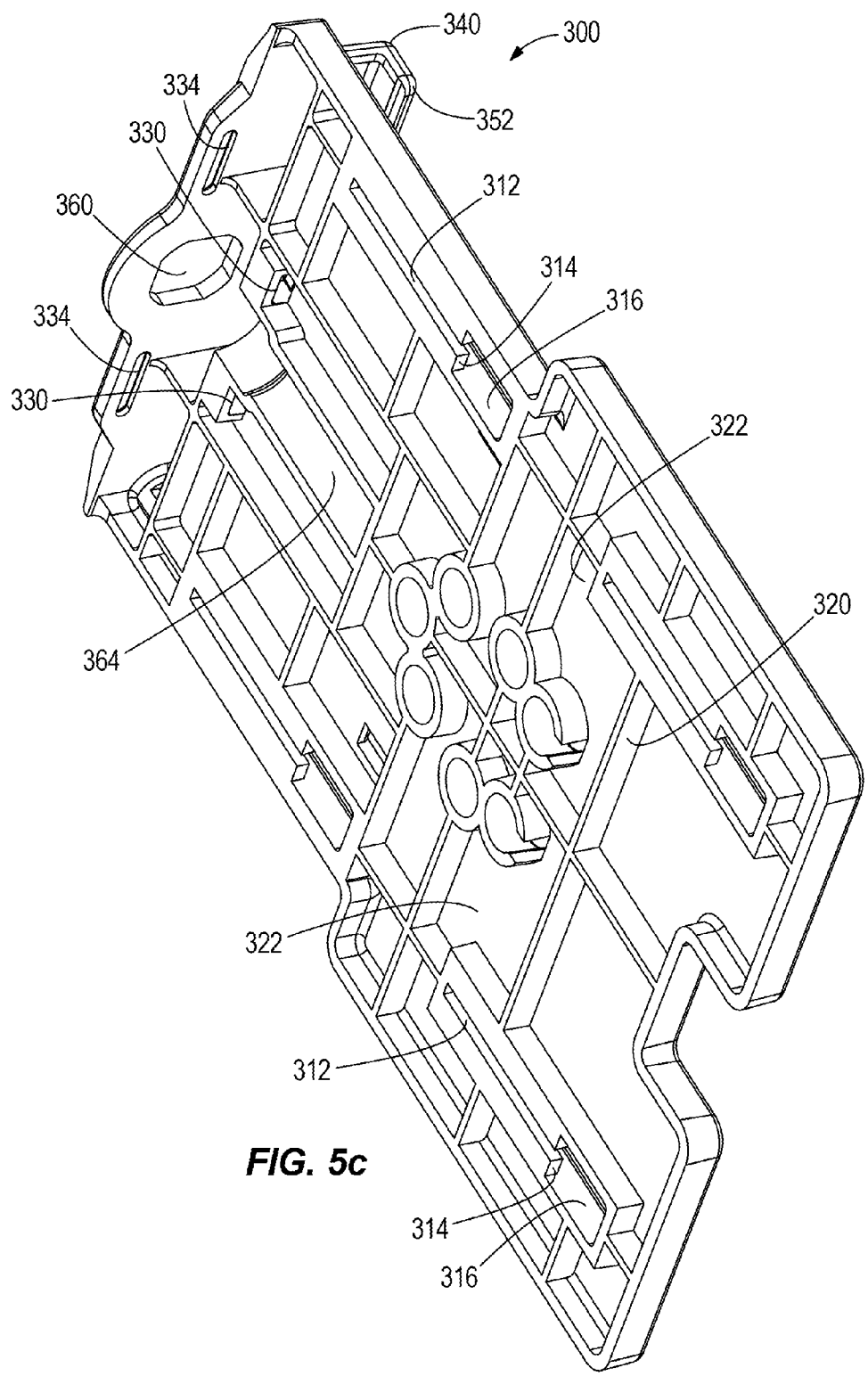
Figure 6:
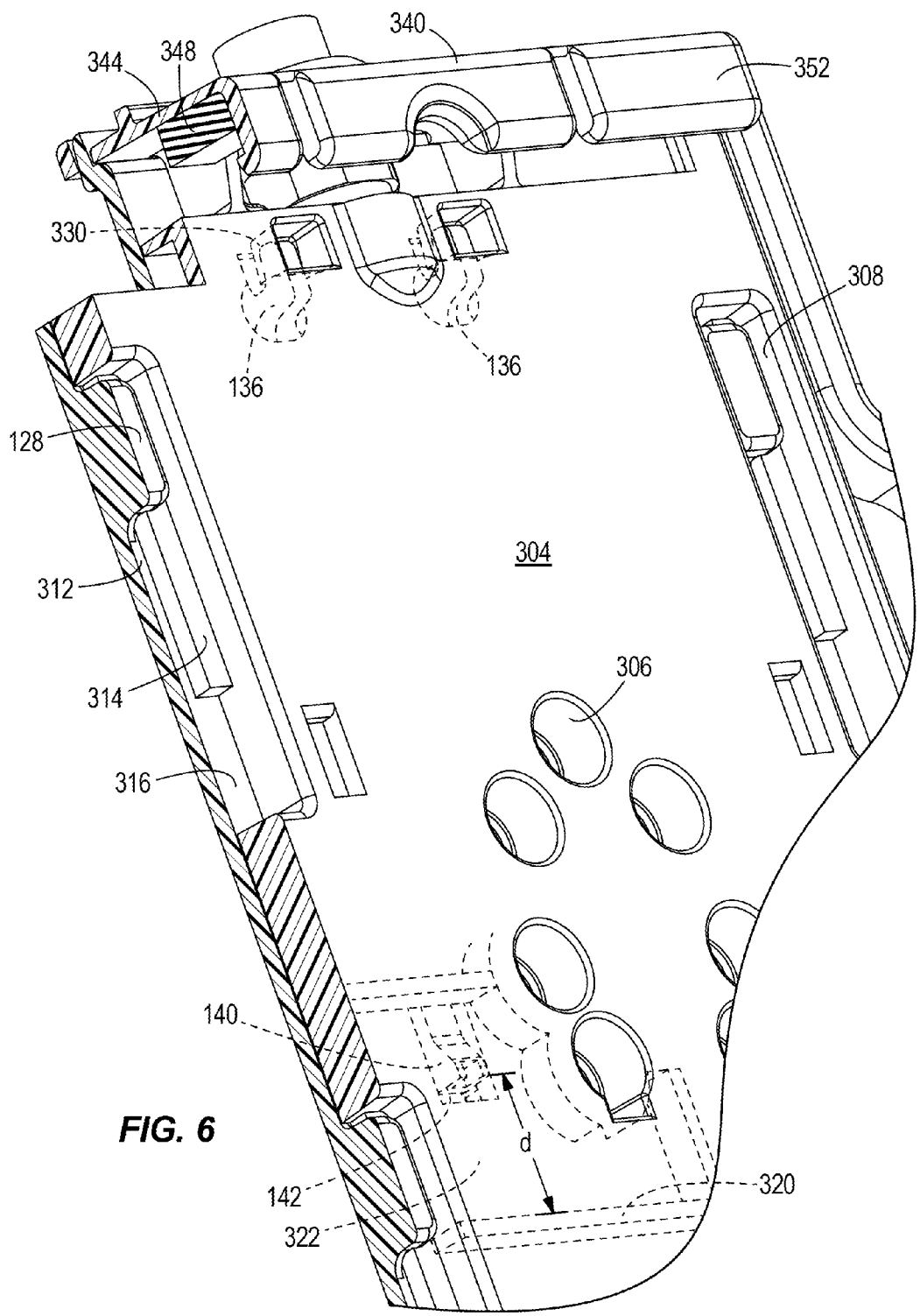
FIG. 6 is an enlarged partial section view taken along line 6-6 of FIG. 2a showing portions of the base and the slide of the docking assembly.

Referring to FIGS. 5a, 5c, and 6, which identifies hidden features of the assembled base 100 and the slide 300 when the slide 300 is in the retracted position, a pair of ledges 330 form recesses to catch the pair of locking hooks 136 previously described on the base 100. As shown in FIG. 5c, upper apertures or slots 334 are sized to receive the locking projections 138 previously described to further secure the slide 300 to the base 100. A ridge 320 spans across a portion of the slide 300 and presents an engagement surface for the previously described locking tabs 140 of the base 100. Contact between the protruding edges 142 of the locking tabs 140 and the ridge 320 limits the operable extension of the slide 300. Referring again to FIGS. 5c and 6, the locking tabs 140 reside during normal operation within a hollow 322 formed partially by the ridge 320. As illustrated in FIG. 6, a distance "d" is equal to the range of motion of the slide 300 relative to the base 100 during retraction and extension, which also equates to the range of motion established by the translation of the upper portions 312 of the rectangular slots 308 about the "T" tabs 128.

Referring again to FIGS. 5a-6, the slide 300 includes a cradle 340. The cradle 340 includes a base wall 344 sized and configured to engage and support an edge of the tablet computer 10. The base wall 344 presses against the tablet computer 10 when the base 300 is retracted and includes a foam pad 348 as a contact surface for this purpose to minimize damage to the edge of the tablet computer 10 and to take up any "slack" that may be present. An overhanging lip 352 further secures the tablet computer 10 when the slide 300 is retracted. Mounting holes 306 correspond with the previously described mounting holes 148 of the base 100 when the slide 300 is in the retracted position, thereby allowing coupling or de-coupling of a stand or other device without disassembling the slide 300 from the base 100.

Referring to FIG. 5c, the upper portion of the slide 300 defines an opening 360 for partially receiving the lock 404 (see FIGS. 2b and 2d). The lock mechanism 404, conventionally known as a slam lock, is secured to the slide 300 and is operable to selectively retain the slide 300 in the retracted position. When the tablet computer 10 is docked in the docking station 20 and the lock mechanism 404 activated to retract the slide 300, the tablet computer 10 cannot be removed from the docking station 20 because the cradle 340 cannot move separately from the slide 300. Other lock mechanisms can be substituted for the illustrated slam lock, such as a twist knob lock or other type of lock.

With respect to FIGS. 2d, 7a, and 7b, the lock 404 includes a retractable pawl 430 that, upon contact with a lip 190 of the base 100 during retraction of the slide 300, recedes into the body of the lock 404. Once the pawl 430 passes the lip 190, the pawl 430 once again extends from the lock 404 and is positioned underneath the lip 190. Any contacting force tending to extend the slide 300 is resisted through contact of the pawl 430 with the underside edge 194, preventing the biasing spring 400 from extending the slide 300 upward. The biasing spring 400 is positioned underneath and is operatively coupled to a bottom surface 408 of the lock 404 at a first end 412 (see FIG. 2d). The biasing spring 400 is partially disposed within a slide spring cavity 364, and partially disposed within a corresponding base spring cavity 180, best shown in FIGS. 3a and 3b. The slide spring cavity 364 and the base spring cavity 180 together fully enclose the biasing spring 400 upon assembly of the base 100 with the slide 300. A second end 416 of the biasing spring 400 engages a shelf 184 that forms the bottom of the base spring cavity 180. In an alternative embodiment, one or more biasing springs 400 are positioned adjacent the connector 204 and operatively coupled at one end to the bottom surface 160 and at the other end to a bottom surface of the slide 300 to provide the above-described biasing force.

Referring to FIGS. 7a and 7b, the docking station 20 is functionally movable between an extended position (FIG. 7a), in which the tablet computer 10 can be inserted or extracted, and a retracted position (FIG. 7b), in which the tablet computer 10 is secured by and within the docking station 20. In operation from FIG. 7a to FIG. 7b, a user disposes the tablet computer 10 downwardly and along the front face 304 of the slide 300, aligning the tablet computer 10 with the connector 204. Vertical motion against the curved edge portions 174 of the guide ribs 170 urges the electrical connector of the tablet computer 10 (not shown) into alignment with the connector 204. As previously noted, the connector 204 can pivot to assist with this alignment and connection and, in particular, can pivot toward the bottom lip to accommodate an initial misalignment of the tablet computer 10. Once the tablet computer 10 is suitably positioned and electrically coupled to the connector 204, the user can depress either a push button 420 of the lock 404 or the cradle 340, which forces the slide 300 downward against the upward force of the biasing spring 400. The tablet computer 10 is pressed by the cradle 340, through contact with the foam pad 348, and secured. Concurrently, as shown in FIGS. 2c, 2a, and 6, the upper portions 312 of the rectangular slots 308 travel over and are constrained by the features of the "T" tabs 128 previously described, while the ledges 330 of the slide 300 engage the locking hooks 136 of the base 100 (FIG. 6), and the upper slots 334 receive the locking projections 138 that extend therethrough. Referring again to FIG. 6, the locking hooks 136 cooperate with the ledges 330 to prevent frontward movement by the slide 300 that would separate the slide 300 from the base 100. And as best shown in FIG. 2b, the engagement of the locking projections 138 with the upper slots 334 similarly assists in preventing separation of the slide 300 from the base 100 in a direction normal to the direction of translation of the slide 300 relative to the base 100.

Once electrically coupled, the USB connector can be used to charge the tablet computer 10 or to synchronize the tablet computer 10 with another computer. The audio connection can be used for outputting audio to a car head unit or to powered speakers.

To extract the tablet computer 10, the user pushes down on the push button 420 of the lock 404. This releases the pawl 430, which recedes into the lock 404, allowing the spring 400 to bias the slide 300 upward. Once the slide 300 is sufficiently extended, the tablet computer 10 can be extracted from the docking station 20.

The lock 404 is a keyed lock, in which a key (not shown) can be inserted into a keyhole 436 (see FIG. 2b) and turned to prevent unauthorized removal of the tablet computer 10. After depressing the slide 300 as described, the user can insert the key and turn it to a "locked" position, which, as known to those of ordinary skill with this type of lock, prevents the pawl 430 from receding due to the user pushing down again on the push button 420. In other words, when the lock 404 is locked by the key, pushing down on the push button 420 will not release the pawl 430 to allow the biasing spring 400 to extend the slide 300. Only upon turning the key to the "unlocked" position can the user subsequently depress the lock 404 to extend the slide 300.

During assembly of the slide 300 to the base 100, the slide 300 is positioned such that the flared portions 130 of the "T" tabs 128 pass through the wider portions 316 of the rectangular slots 308. The slide 300, now uniformly adjacent to the base 100, is located beyond the furthest point of normal extension relative to the base 100 in operation, and the ridge 320 is consequently located above the protruding edges 142 of the locking tabs 140. Sliding the slide 300 downward from this position forces the ridge 320 over the locking tabs 140 and resiliently deflects the edges 142 rearwardly. Once the ridge 320 has passed the locking tabs 140 they spring back into position and are now within the hollow 322. The "T" tabs 128 are also now near the bottom of the narrow portions 312 of the rectangular slots 308. Due to blocking contact between the ridge 320 and the edges 142 of the locking tabs 140, the slide 300 cannot be overextended into a position in which the flared portions 130 again align with the wider portions 316 without moving the edges 142 rearward to allow the ridge 320 to upwardly pass. The slide 300 is thus locked into a range of operable motion.

Figure 8:
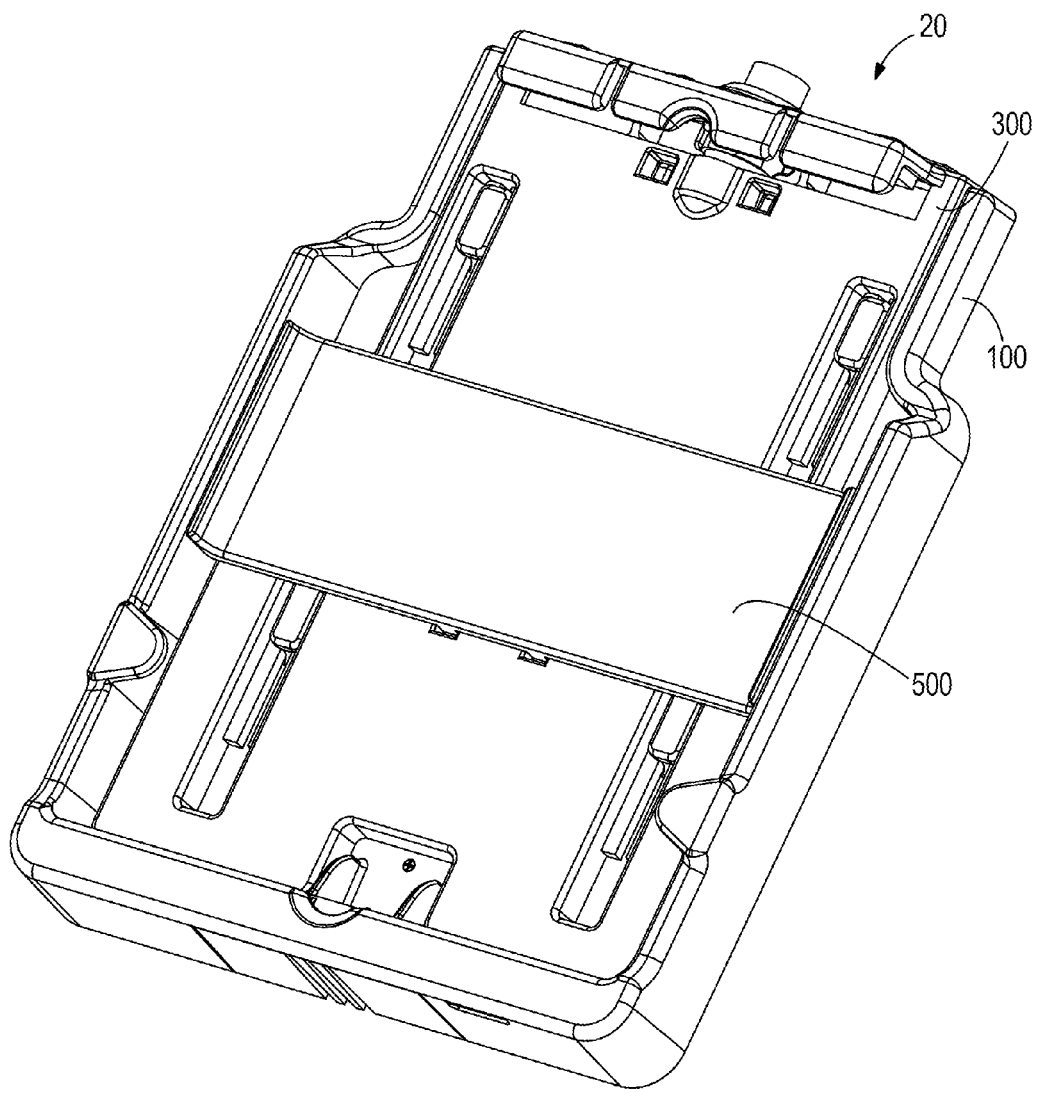
FIG. 8 is a second perspective view of the docking station embodying the invention showing a snap-in adapter.

Referring to FIG. 8, a snap-in adapter 500 can be removably pressed into the slide 300 using snap connections through the catches 510 and 520, illustrated in FIGS. 5a and 5b. The snap-in adapter 500 in conjunction with the previously described foam pad 348 allows for compatibility with other sizes of tablet computer 10, and specifically for the retention of a physically smaller tablet computer 10 (e.g., the iPad 2® compared to the iPad®).

FIGS. 9a-11b illustrate another docking station 620. Except as described below, the docking station 620 is the same as the docking station 20 and like elements are given the same reference numerals.

Figures 9A, 9B:
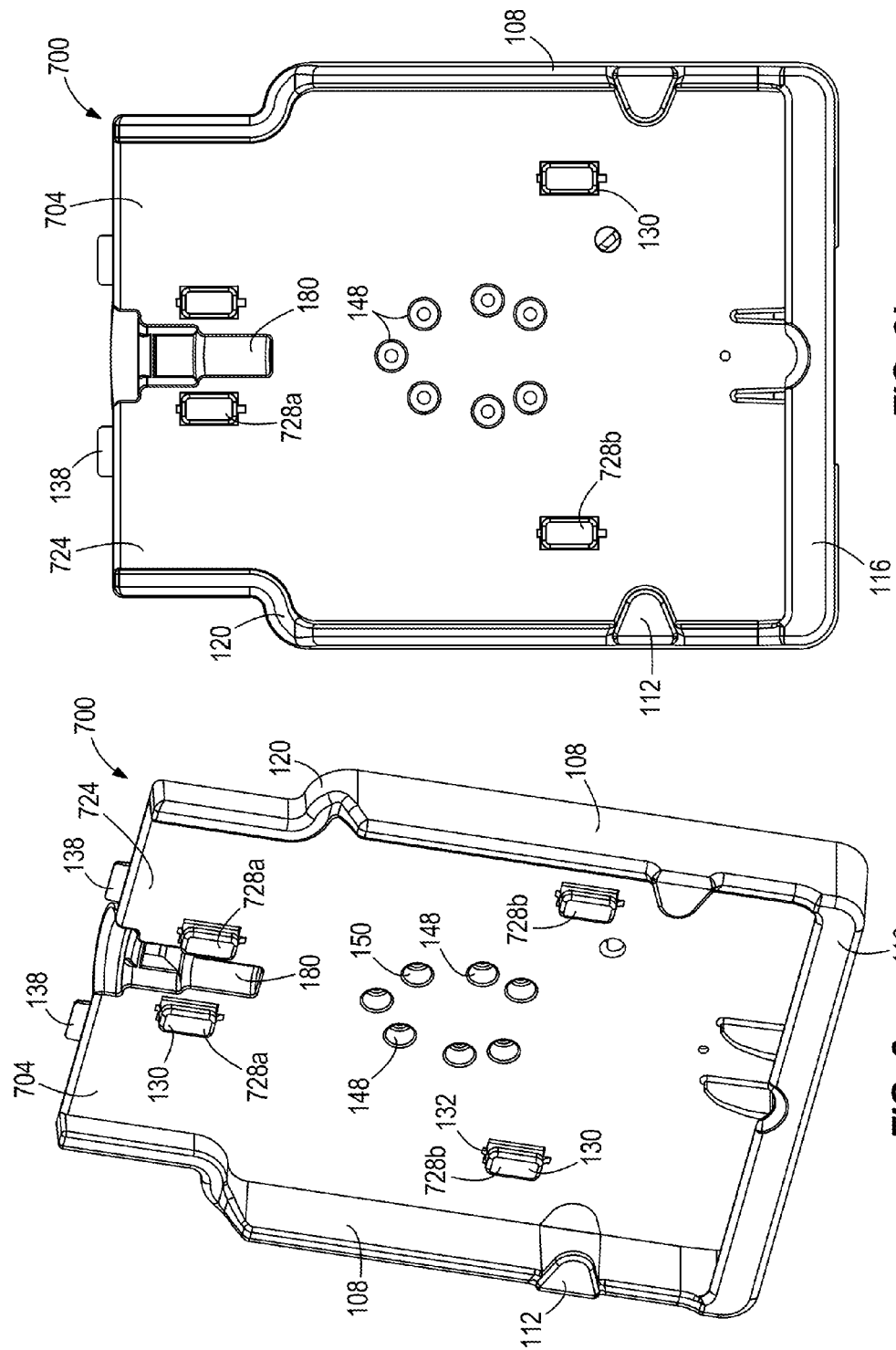

Referring to FIGS. 9a and 9b, a base 700 includes a panel 704 having a front face 724. Extending from the front face 724 of the panel 704 are four "T" tabs 728a, 728b, identical in structure to "T" tabs 128. The "T" tabs 728a are located in closer proximity to each other than are the "T" tabs 728b and, in comparison to the uppermost "T" tabs 128 of FIGS. 3a and 3b, are closer in proximity to the base spring cavity 180. As with the tabs 128, the tabs 728a, 728b engage a slide 900 (see FIGS. 10a-10c) and prevent frontward movement of the slide 900 away from the base 700 while allowing translation between an extended position and a retracted position. The configuration of the "T" tabs 728a, 728b as illustrated, and in particular of the tabs 728a, obviates the need for the locking hooks 136 provided with the base 100.

Referring to FIGS. 10a and 10b, the slide 900 includes a generally planar front face 904. Rectangular slots 908a, 908b engage and functionally translate over the previously described "T" tabs 728a, 728b, respectively, of the base 700. The rectangular slots 908a each include the upper portion 312, rails 314, and the bottom portion 316 previously described with respect to slots 308. The slots 908a are closer in proximity to each other than the top slots 308 of FIGS. 5a and 5b in correspondence with the "T" tabs 728a. The upper portions 312 of the slots 908a slide about the neck portion 132 of each "T" tab 728a during retraction and extension of the slide 700, as previously described for the docking station 20, to prevent frontward and lateral movement that would separate the slide 900 from the base 700. Slots 908b include a narrow upper portion 912, rails 914, and a wider bottom portion 916, which similarly cooperate with the "T" tabs 728b.

Figure 10C:
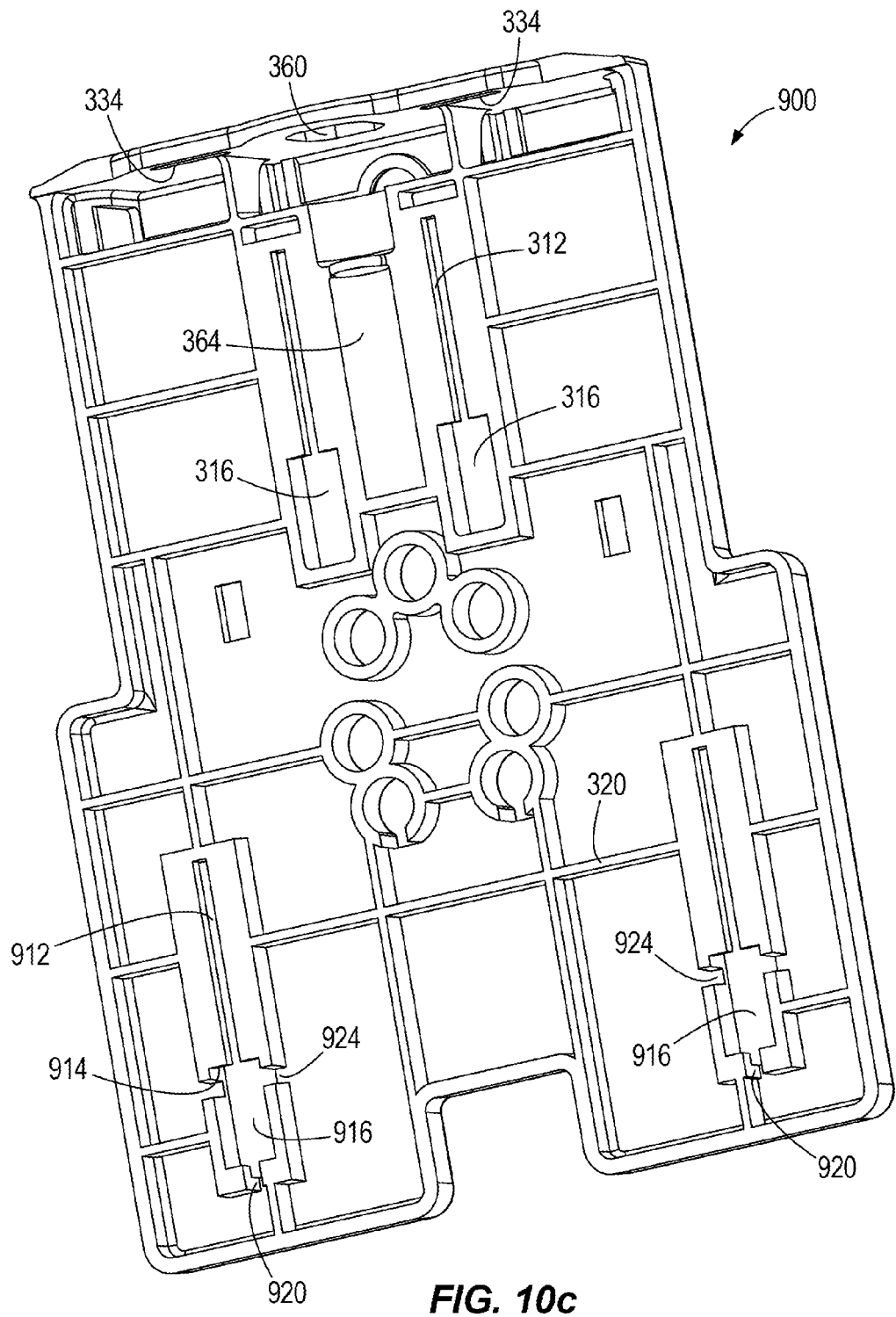

Referring to FIGS. 10a-10c, the bottom portions 316, 916 of the slots 908a, 908b are sized to accommodate the flared portions 130 during assembly of the slide 900 to the base 700. As shown in FIG. 10c, the bottom portions 916 each include a bottom slot 920 and lateral notches 924 to receive and retain a locking member in the form of an insert or insert block 930, best illustrated in FIGS. 10d and 10e.

Figure 10D:
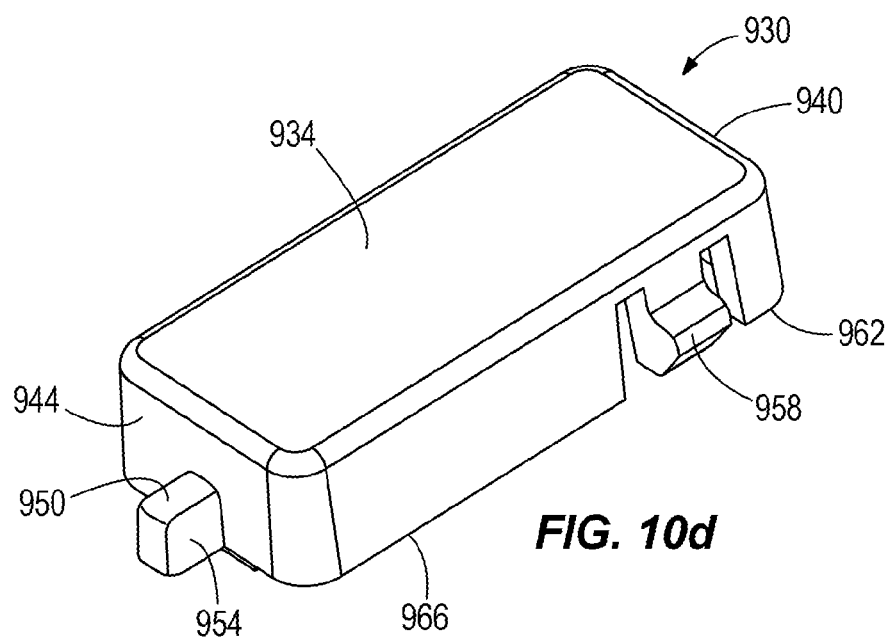
Figure 10E:
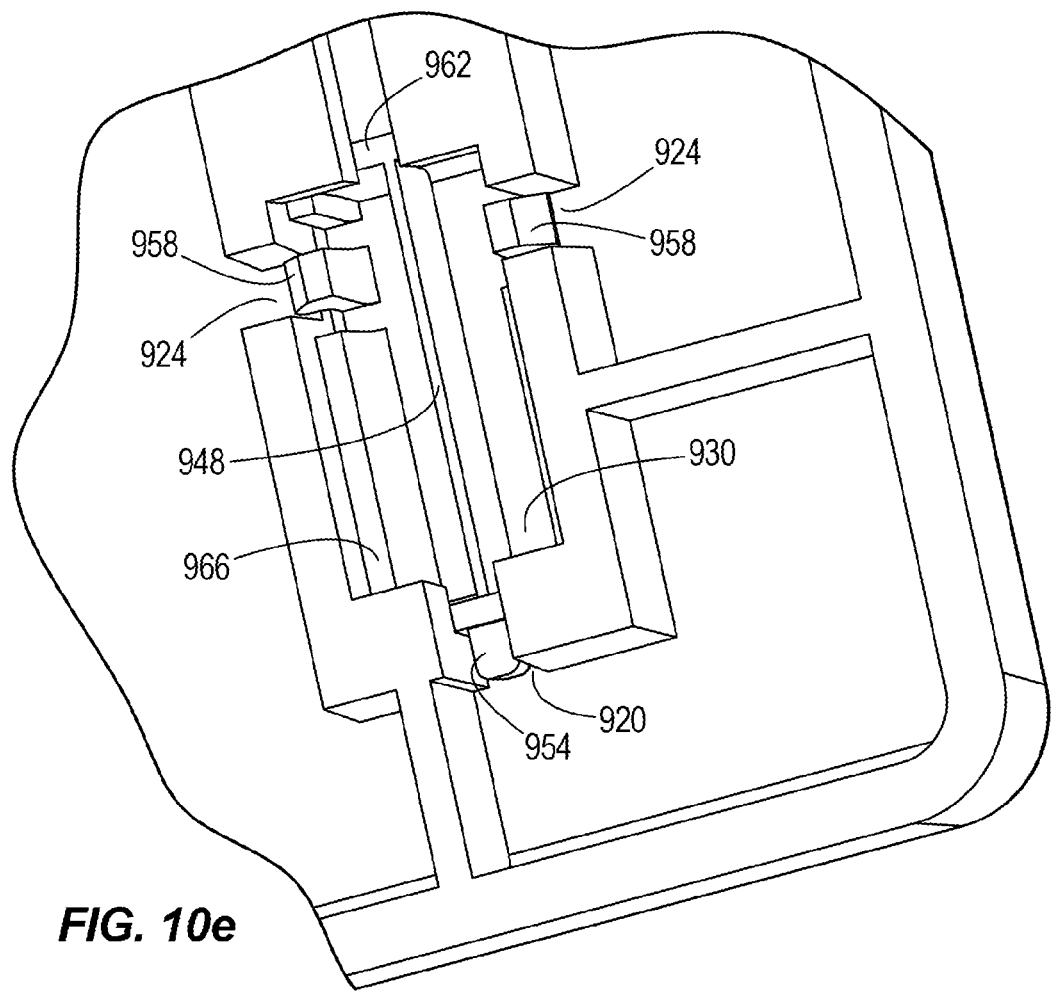

With reference to FIGS. 10d and 10e, the insert block 930 presents a generally rectangular form with a front face 934 and first and second contact sides 940, 944. A supporting rib 948 bisects the block 930 lengthwise to provide reinforcement between the first and second contact sides 940, 944. When positioned within the bottom portion 916, a front face 950 of a tongue 954 and a pair of opposing hooks 958 resist frontward movement of the block 930 away from the slide 900, while an upper rim 962 and a bottom rim 966 hinder rearward movement. The blocks 930 are formed to be non-removable from the slide 900 without destruction of one or more components of the docking station 620. Once assembled, there is no access to remove the blocks 930.

Figure 11A:
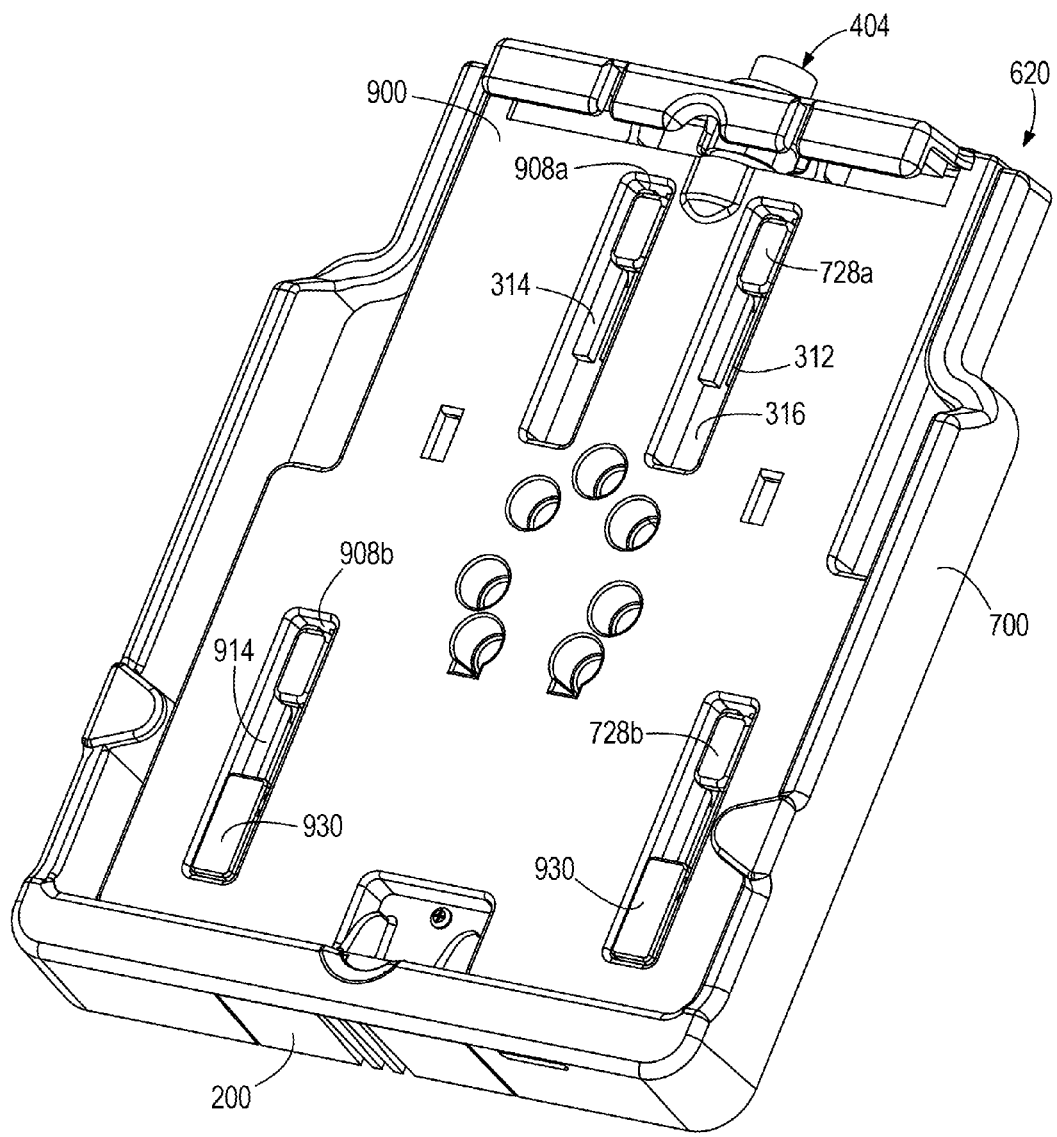
FIG. 11a is a front perspective view of the alternative docking station in a retracted position.
Figure 11B:
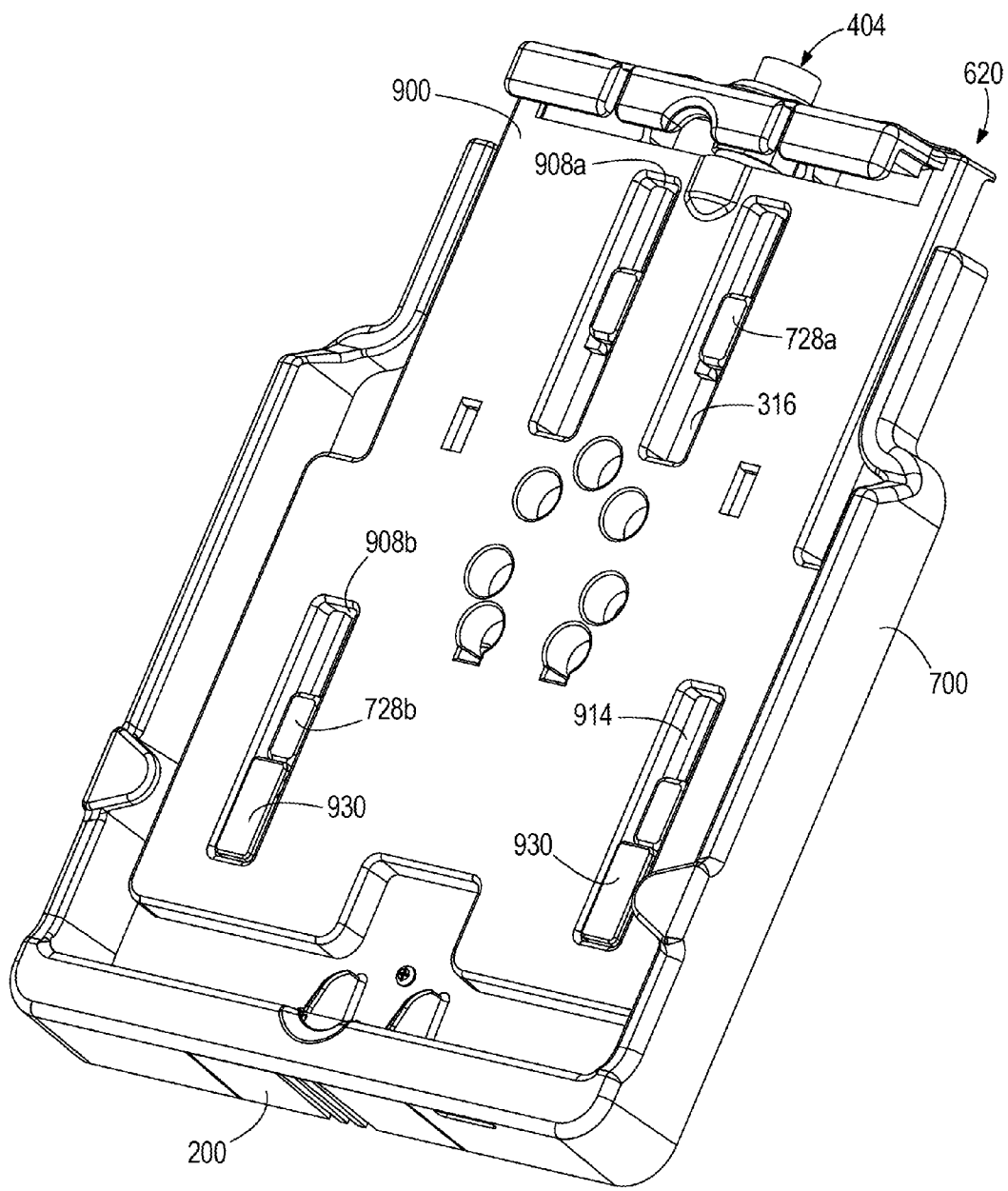
FIG. 11b is a front perspective view of the docking station of FIG. 11a in an extended position.

When assembled, the blocks 930 limit movement of the slide 900 beyond its operable range of motion during retraction and extension established by translation of the upper portions 312, 912 of the slots 908a, 908b about the "T" tabs 728a, 728b. Specifically, due to blocking contact between the "T" tabs 728b and the first contact side 940 of the block 930, the slide 900 cannot be overextended into a position in which the flared portions 130 again align with the wider portions 316, 916. Thus, the locking tabs 140 of the base 100 of the docking station 20 are not needed with the docking station 620. The interaction of the blocks 930 with the "T" tabs 728b is best illustrated in FIGS. 11a and 11b, which show the base 700 and slide 900 in the retracted position (FIG. 11a) and the extended position (FIG. 11b).

During assembly of the slide 900 to the base 700, the slide 900 is positioned such that the flared portions 130 of the "T" tabs 728a, 728b pass through the wider portions 316, 916, respectively, of the rectangular slots 908a, 908b. The slide 900, now uniformly adjacent to the base 700, is located beyond the furthest point of normal extension relative to the base 700 in operation and must be extended for insertion of the block 930. The tongue 954 of the block 930 is disposed into the bottom slot 920 from the front side, and the block 930 is rotated rearward, which depresses the hooks 958, resiliently squeezing them laterally inwardly, until they catch behind the front face 904 within the lateral notches 924, thereby locking the block 930 in place.

Figure 12:
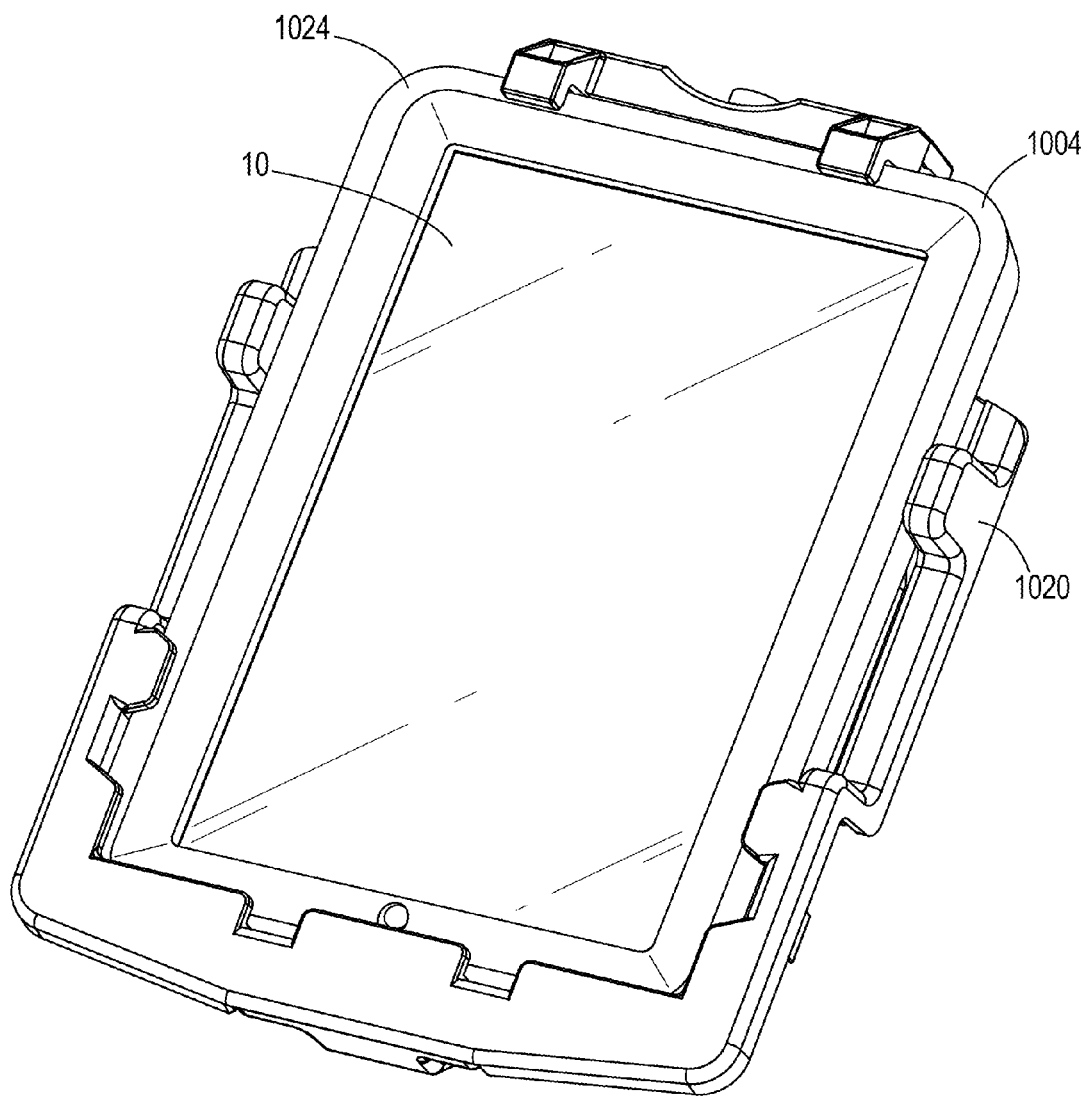
FIG. 12 is a perspective view showing a tablet computer docked in another docking station embodying the invention.
Figure 19A:
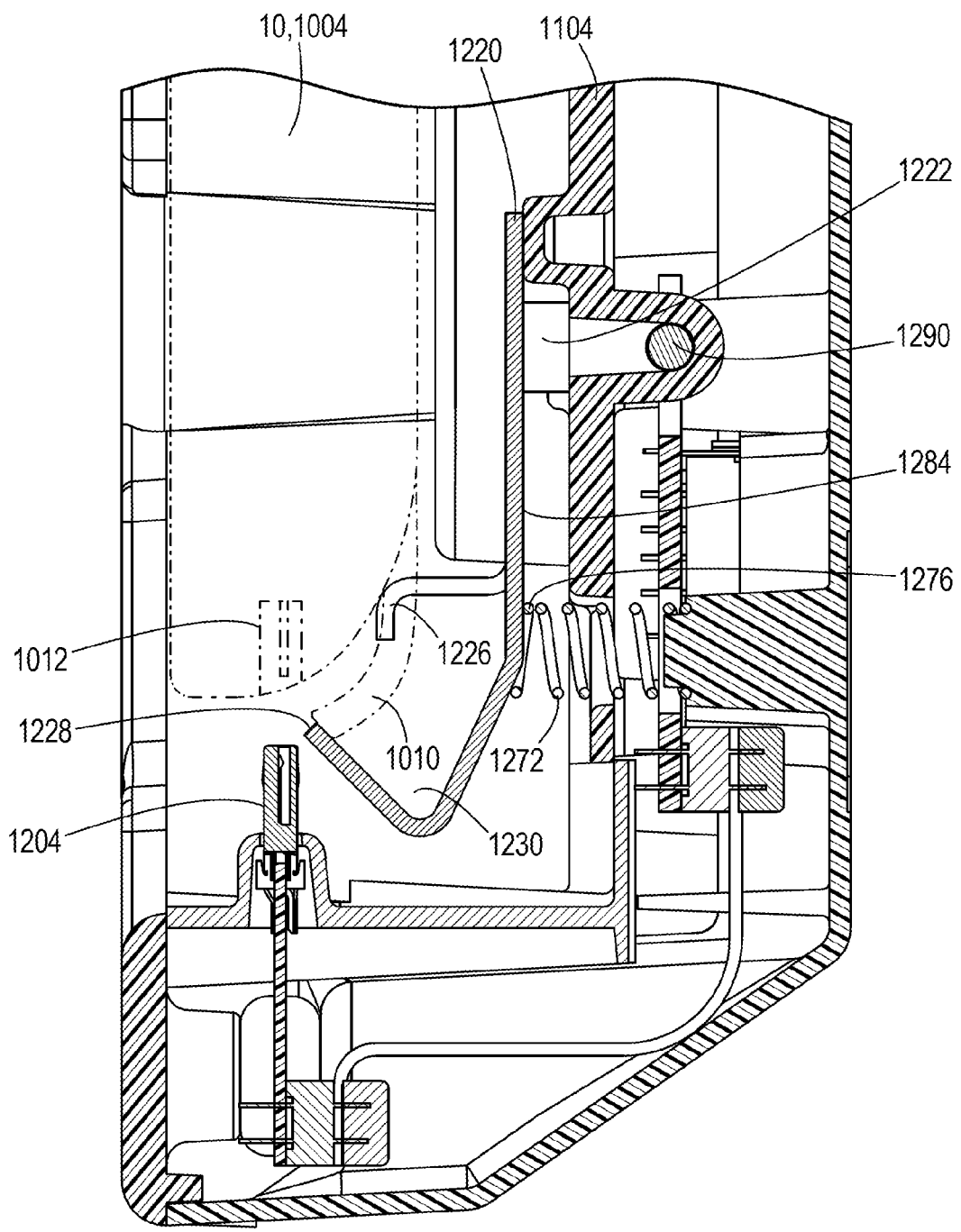
FIG. 19a is a section view showing a tablet computer in position for docking with the docking station of FIG. 12.
Figure 19B:
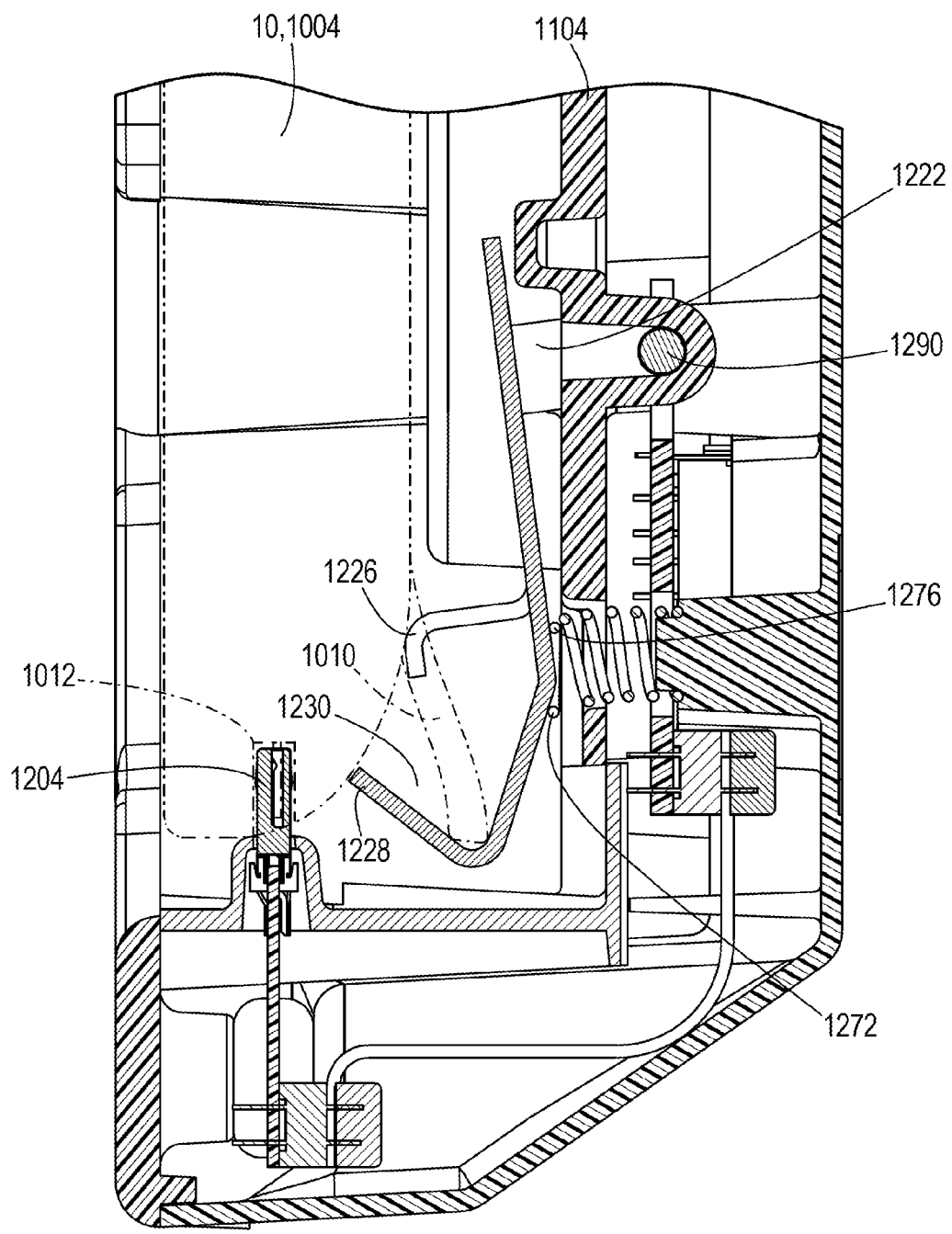
FIG. 19b is a section view showing a tablet computer docked in the docking station of FIG. 12.

FIG. 12 illustrates a tablet computer 10 docked in another docking station embodiment 1020 of the present invention. The docking station 1020 may be configured for a particular brand of tablet computer, such as the Apple iPad® 2 or Apple iPad® (3rd Gen) that is further secured within a particular brand of ruggedized tablet computer case 1004, such as those manufactured by OtterBox®, for example, a computer case of the OtterBox Defender Series®. The case 1004 includes a retractable connector access panel or flap 1010 that protects the tablet computer's bottom connector port 1012 (see FIGS. 19a and 19b), and the docking station 1020 is operable to support and electrically couple to the bottom connector port 1012 while the tablet computer 10 is within the case 1004. As with previous embodiments, the docking station 1020 can be mounted virtually anywhere the tablet computer 10 might be used, such as in a vehicle or on a movable cart, with the appropriate mounting hardware (not shown).

Figure 13A:
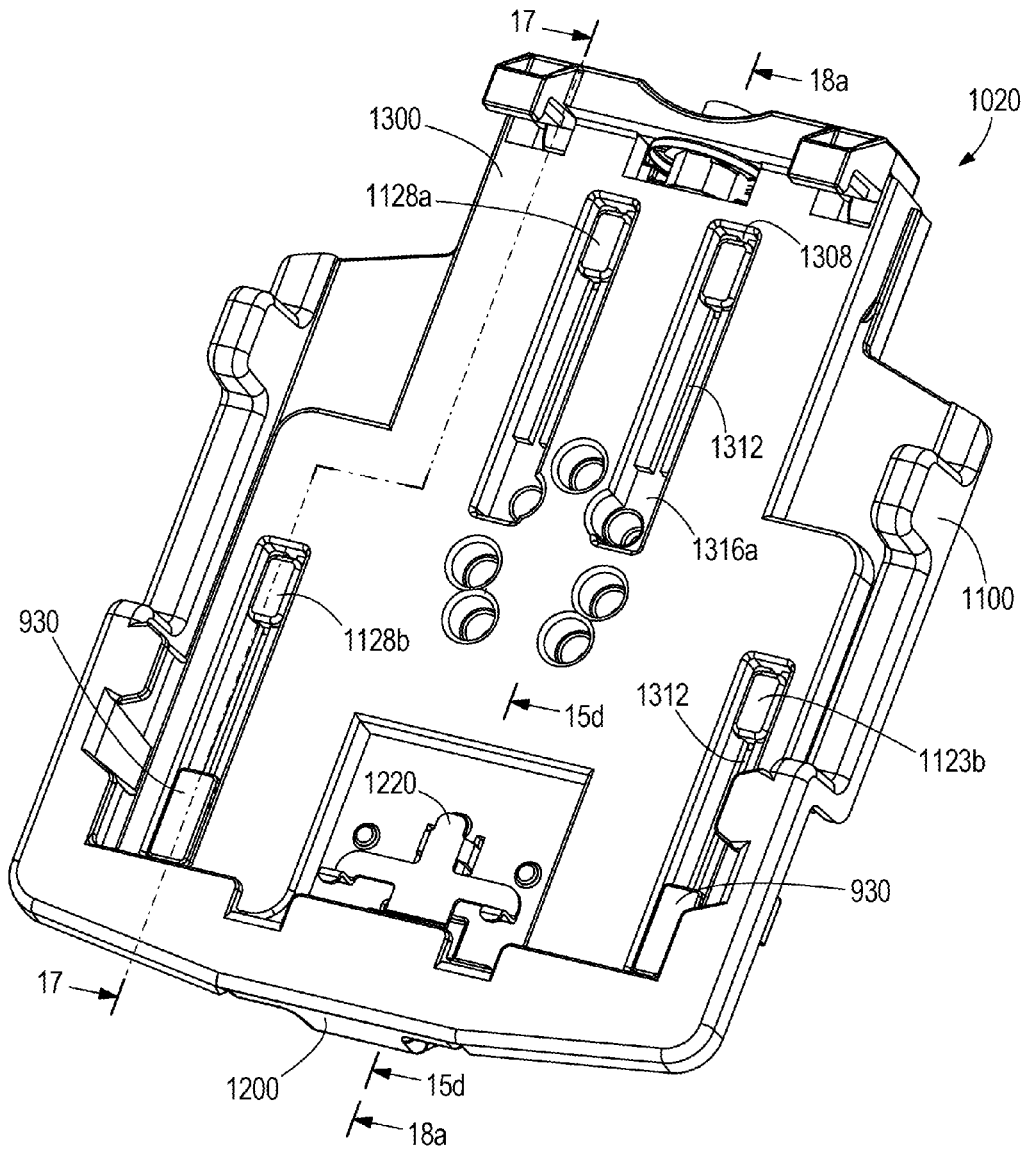
FIG. 13a is a front perspective view of the docking station of FIG. 12 in a retracted position.
Figure 13B:
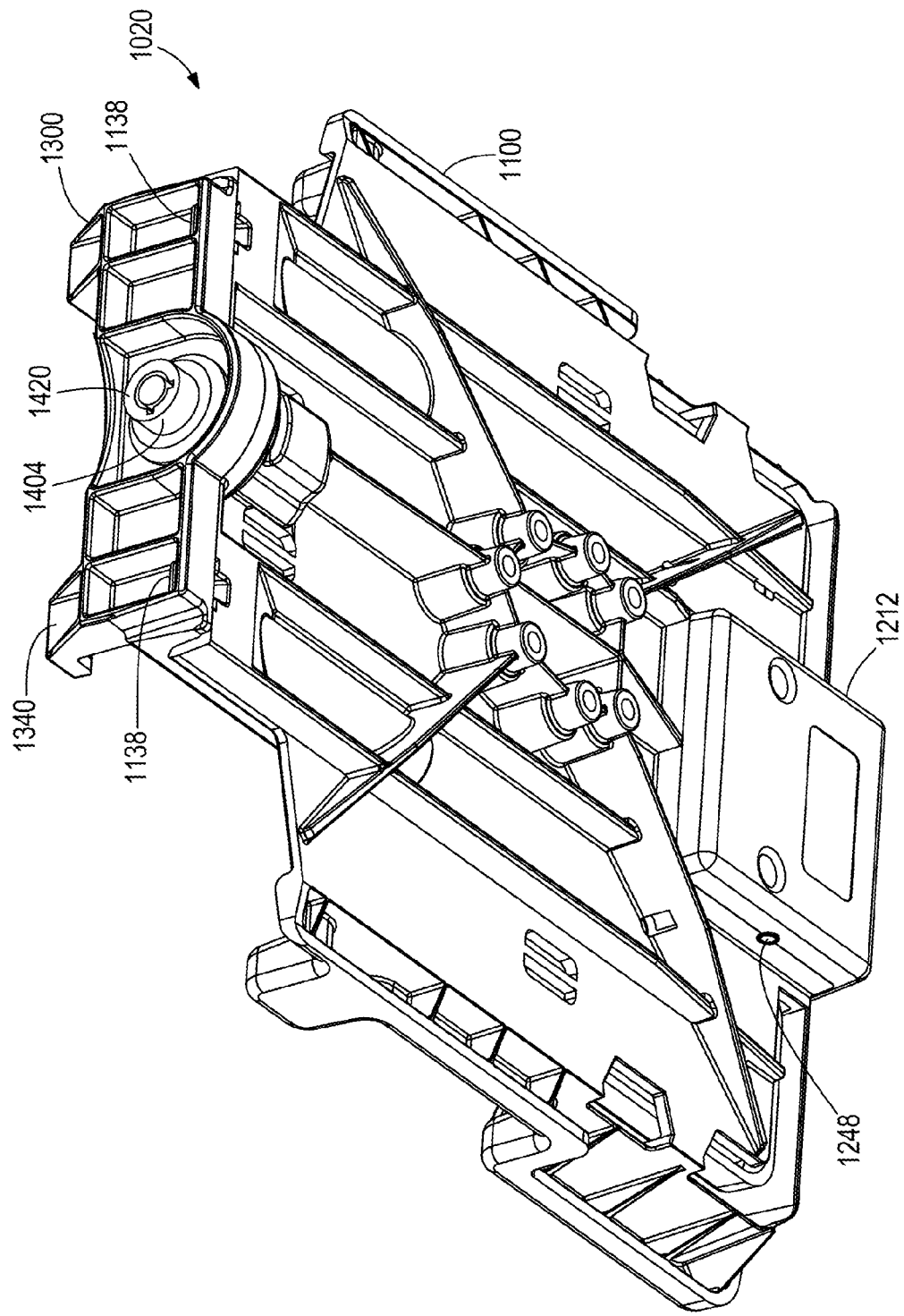
Figure 13C:
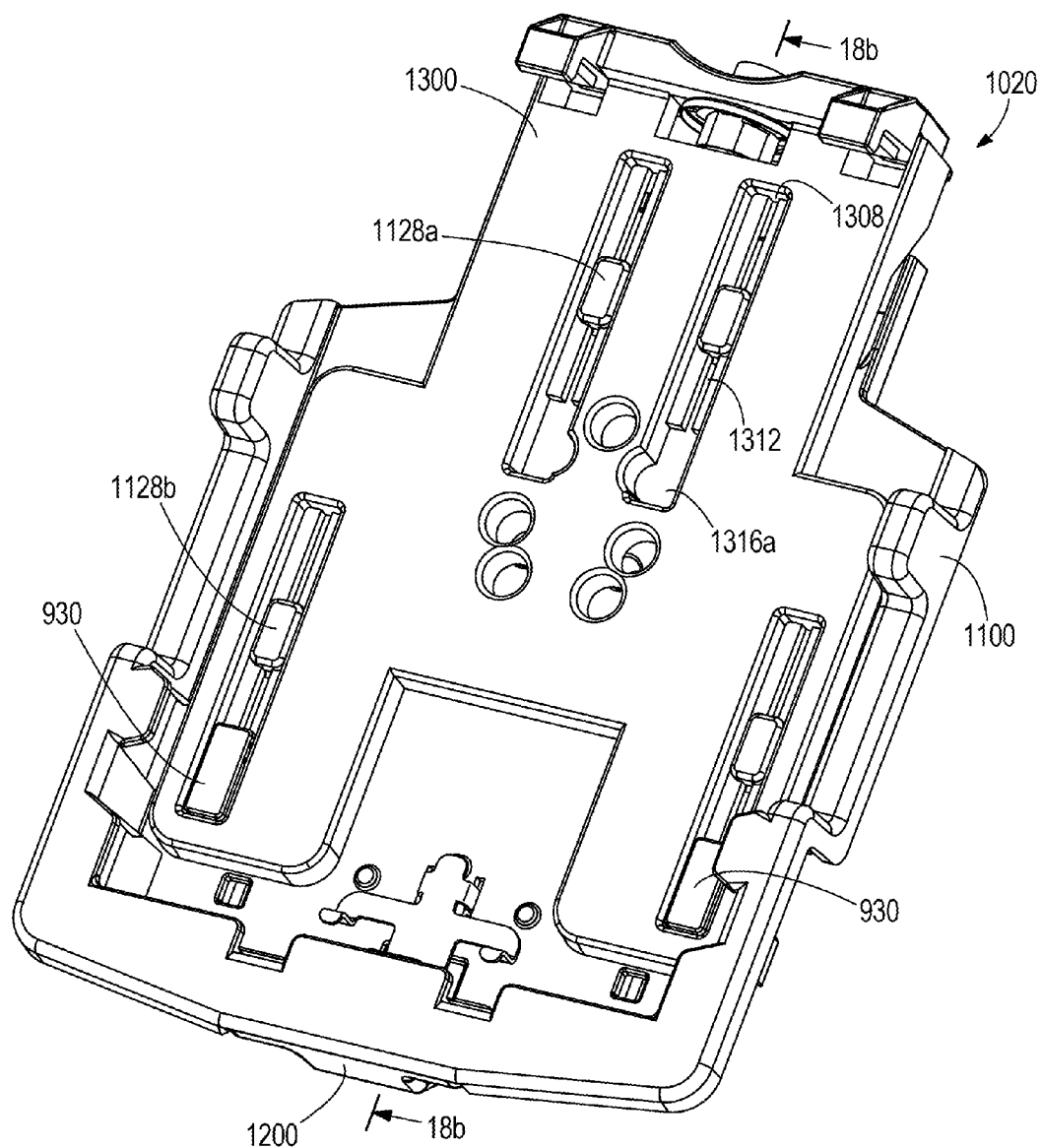
FIG. 13c is a front perspective view of the docking station of FIG. 12 in an extended position.
Figure 13D:
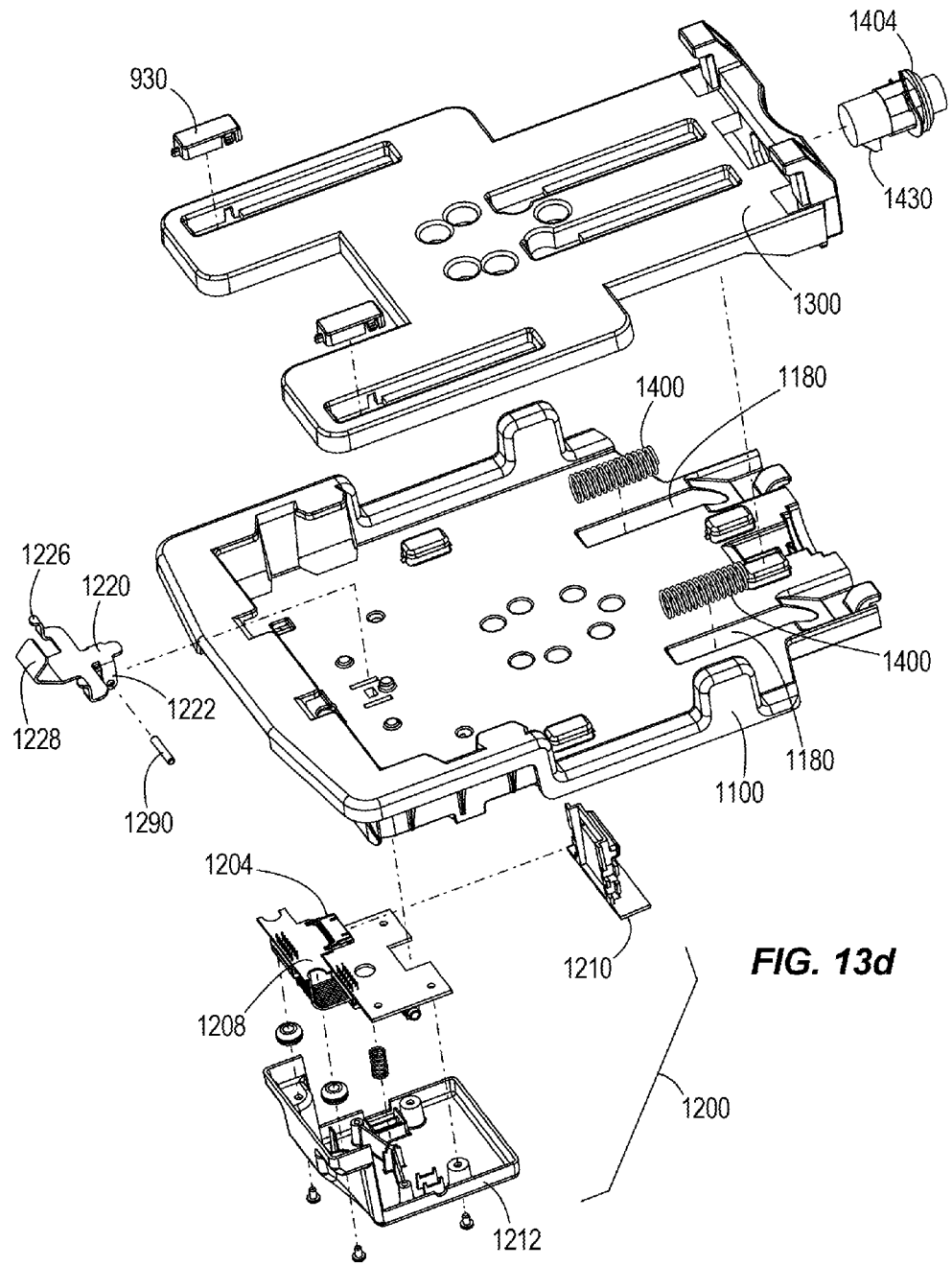
FIG. 13d is an exploded view of the docking station of FIG. 12.

Referring to FIGS. 13a and 13c, the docking station 1020 is shown without a tablet computer 10. The docking station 1020 includes a base 1100, a connector assembly 1200, and a slide 1300. As will be more fully described below, the slide 1300, in an extended position (FIG. 13c) permits the insertion of the tablet computer 10 with the case 1004 into the docking station 1020. Retracting slide 1300 secures the tablet computer 10 and case 1004 in docking station 1020. Referring to FIG. 13d, the connector assembly 1200 includes a connector 1204, a connector circuit board 1208, a filler panel 1210, and a cover 1212. A pair of biasing springs 1400 bias the slide 1300 in the extended position, and a lock mechanism 1404 prevents unauthorized withdrawal of the tablet computer 10 from the docking station 1020, as will also be further detailed below. The base 1100, slide 1300, filler panel 1210, and the cover 1212 are primarily plastic (e.g., polycarbonate resin), but in other embodiments could be primarily metal or other suitable materials. The docking station 1020 also includes electrical components and steel hardware. Other materials and methods of manufacture do not limit the docking station 1020 as presently described.

Figure 14C:
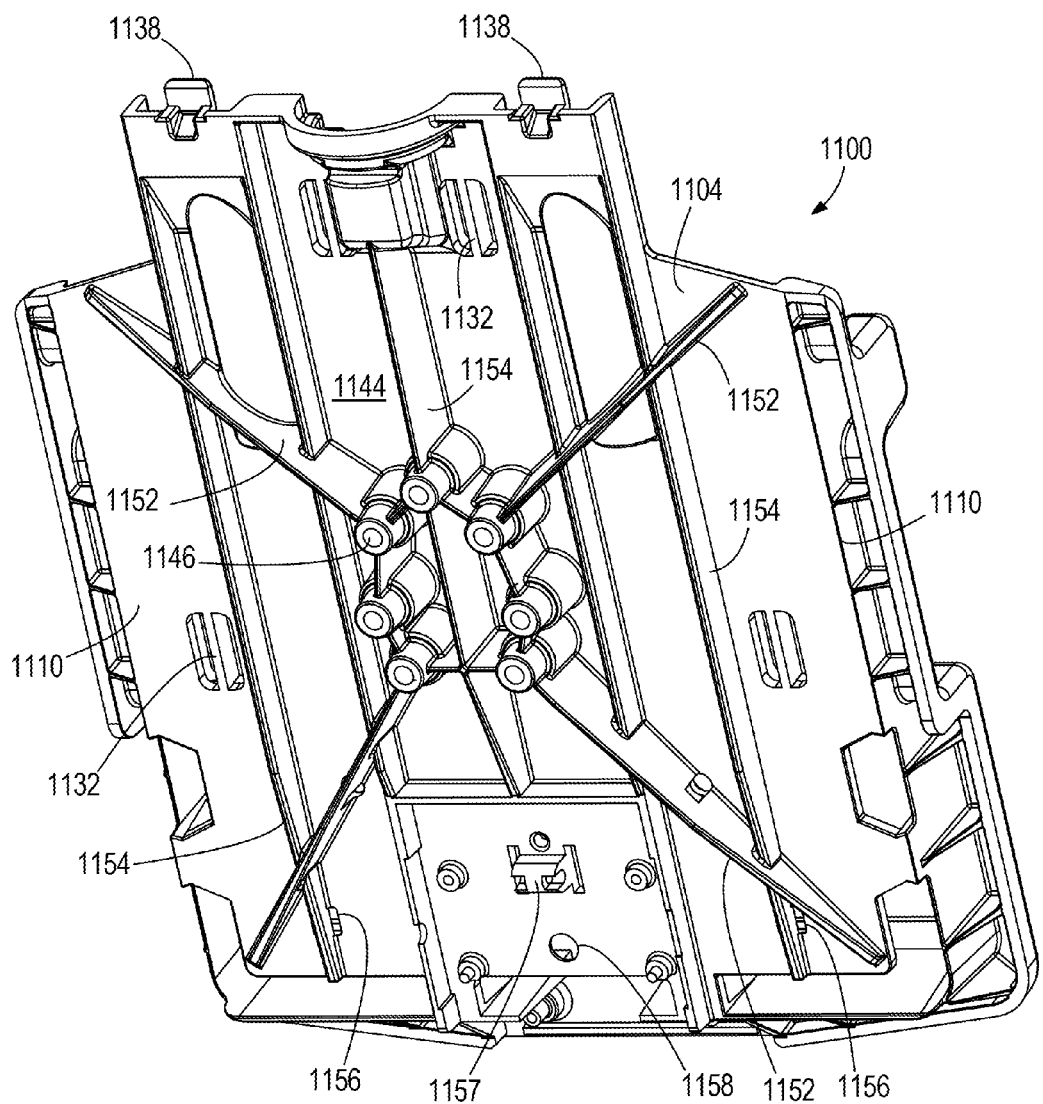

Referring to FIGS. 14a-14c, the base 1100 includes a panel 1104 having a front face 1124. Extending frontwardly along a partial periphery of the panel 1104 are opposing walls 1108 located predominantly along the lateral sides 1110 of the panel 1104. The walls 1108 assist in aligning and retaining the case 1004 upon insertion. Each wall 1108 extends only partially along the panel 1104 such that the case 1004 can be grasped at a top corner 1024 (see FIG. 12) for easier withdrawal from the docking station 1020. Outer tabs 1112 projecting inwardly from the walls 1108 and a bottom lip 1116 extending across the bottom of the base 1100 are both substantially parallel to the front face 1124 and provide additional support to the inserted case 1004, as well as restraint from frontward movement.

Extending from the front face 1124 of the panel 1104 are four "T" tabs 1128a, 1128b. The "T" tabs 1128a are located in closer proximity to each other than are the "T" tabs 1128b. Each "T" tab 1128 includes a flared portion 1130 that adjoins and is integral with the panel 1104 through a neck portion 1132. The "T" tabs 1128 engage the slide 1300 and prevent frontward movement of the slide 1300 away from the base 1100 while allowing translation between the extended position and the retracted position, as will be further described (see FIGS. 16a-16b). A pair of locking projections 1138 cooperate with corresponding structure in the slide 1300 (see FIG. 16c) to provide additional resistance to frontward movement of the slide 1300 in the retracted position, as further detailed below.

Referring to FIGS. 14a and 14c, interconnected and integrated fastening members 1146 project from a rear face 1144 of the panel 1104 to define universal mounting holes 1148 in an AMPS-NEC compatible hole pattern configured for the coupling of a stand or other device such that the docking station 1020 can itself be mounted on another surface. As shown in FIG. 14a, the mounting holes 1148 are counterbored for installation of hardware flush with or below the front face 1124, and the inside surface 1150 of each mounting hole 1148 is circular and smooth such that unfastened screws can rotate freely within the holes 1148. Referring to FIG. 14c, struts 1152 and ribs 1154 distribute pressure from the weight of the docking station 1020 components and from additional external forces on the docking station 1020 more uniformly, decreasing bending and other stresses that could otherwise develop throughout the docking station 1020. Orifices 1156 provide strain relief to external accessory cables associated with the connector assembly 1200. In addition, a pivot mount 1157 is integrally formed with the panel 1104 and extends rearward from the rear face 1144 above an aperture 1158.

Figure 15A:
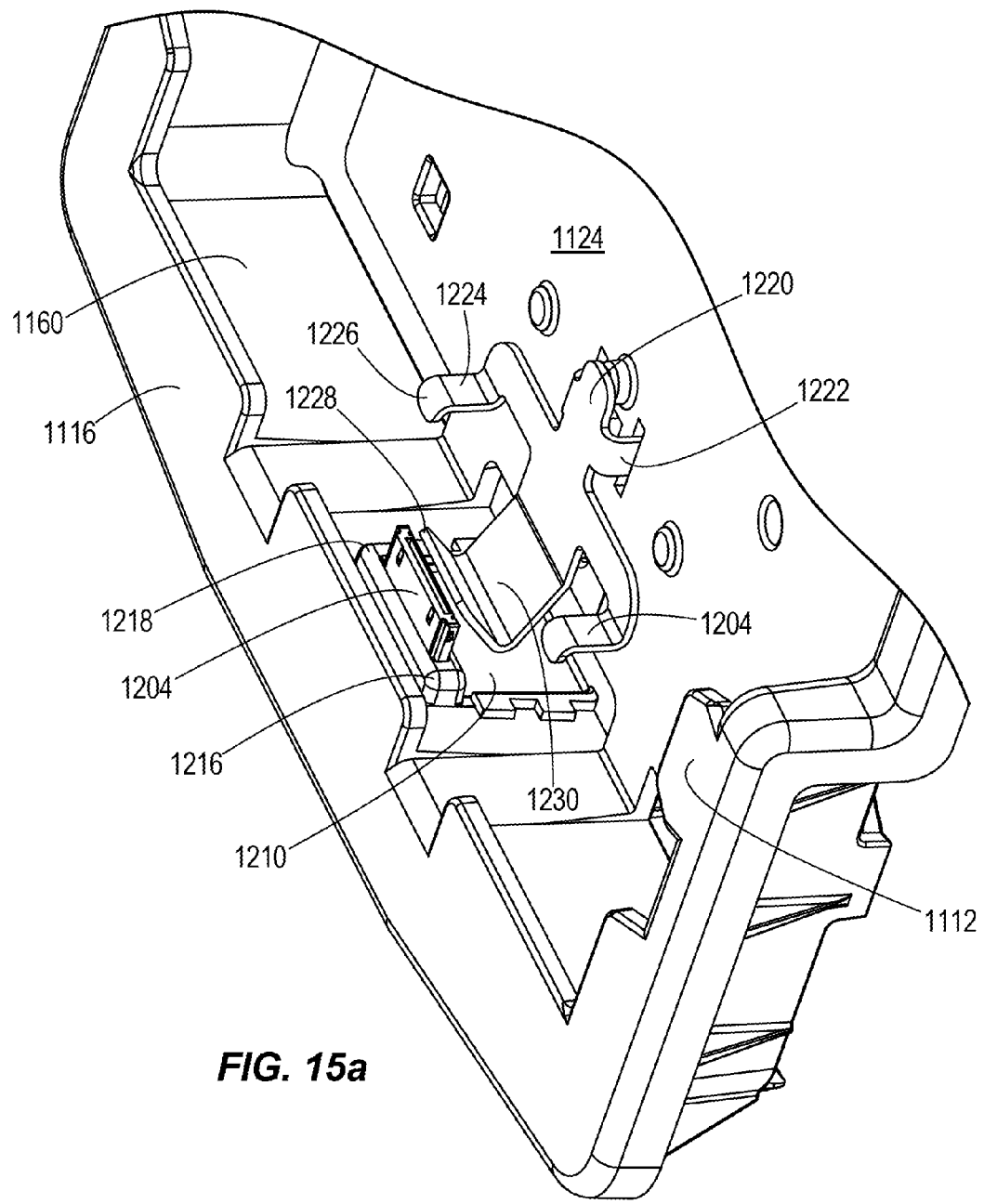
FIG. 15a is an enlarged partial view of a bottom portion of the docking station of FIG. 12 showing the connector of the connector assembly.

Referring now to FIG. 15a, an adjacent or bottom face 1160 (i.e., a bottom face in the illustrated orientation, but could also be a side face or top face depending on orientation—therefore adjacent face 1160 can also be used) is positioned between and substantially orthogonal to the front face 1124 and the bottom lip 1116. The filler panel 1210 is positioned at the approximate midpoint of the face 1160 with respect to the sides 1110 and forms a partial housing 1216 defining an aperture 1218 through which the connector 1204 of the connector assembly 1200 extends. The positioning of the connector 1204 and associated components need not be central with respect to the face 1160, and the modifications necessary to the docking station 1020 to permit other positions of the connector 1204 along the face 1160 and to accommodate a variety of tablet computers 10 and cases 1004 are within the scope of the invention.

The connector 1204 is adaptable to electrically connect to a mating connector positioned at the bottom of the tablet computer 10, such as a 30-pin connector of the iPad® or iPad 2® tablet computers previously described, e.g., the bottom connector port 1012. A retraction member or puller member 1220 is pivotably coupled to the panel 1104 through pivoting members 1222 and is biased in the position shown in FIG. 15a. The puller member 1220 presents opposing arms 1224 defining a contact surface with downwardly curving ends 1226 and a receiving surface in the form of an arm or flap 1228 that defines a receptacle 1230, the purpose of which will be further described below.

Figure 15B:
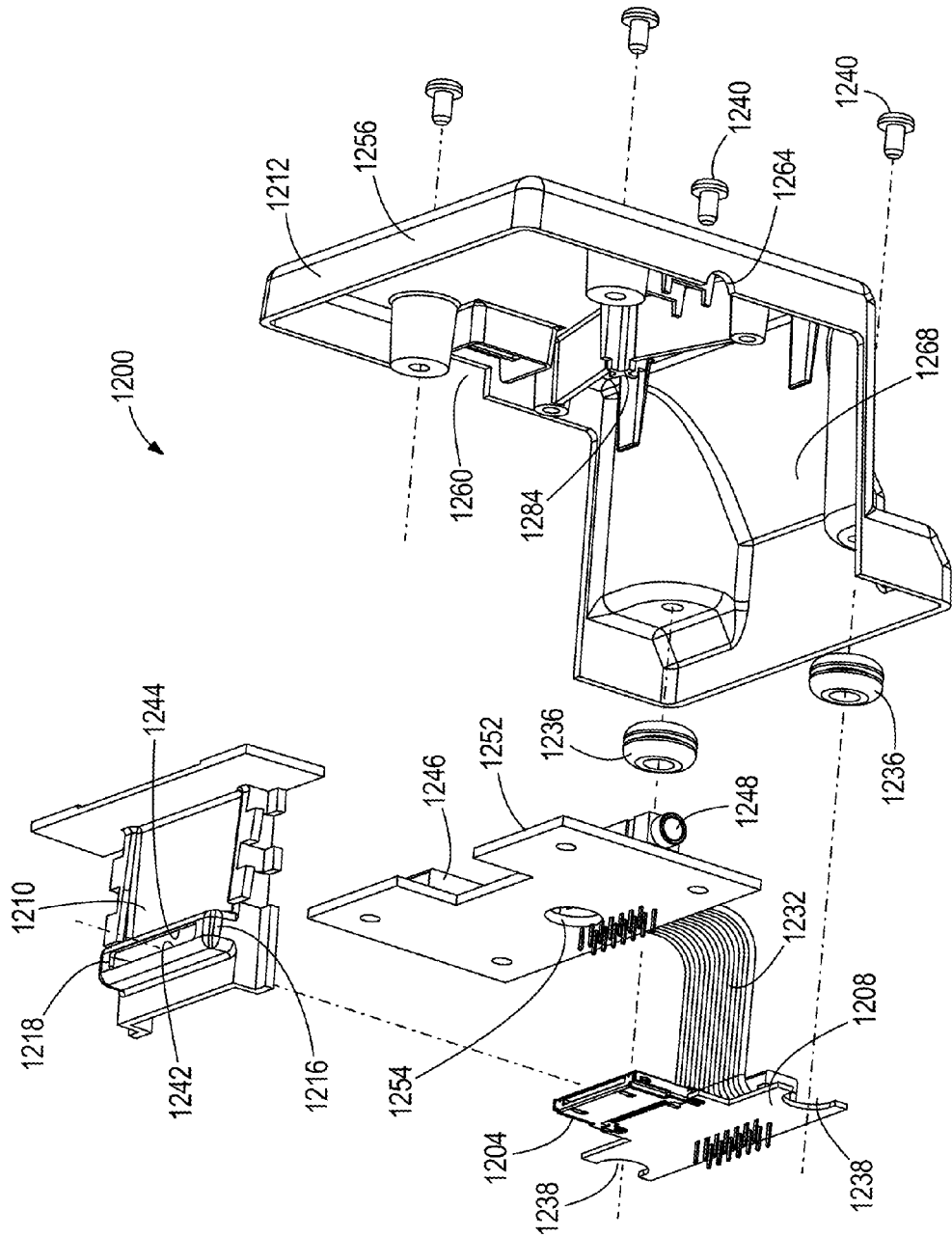
FIG. 15b is an exploded view of the connector assembly.
Figure 15C:
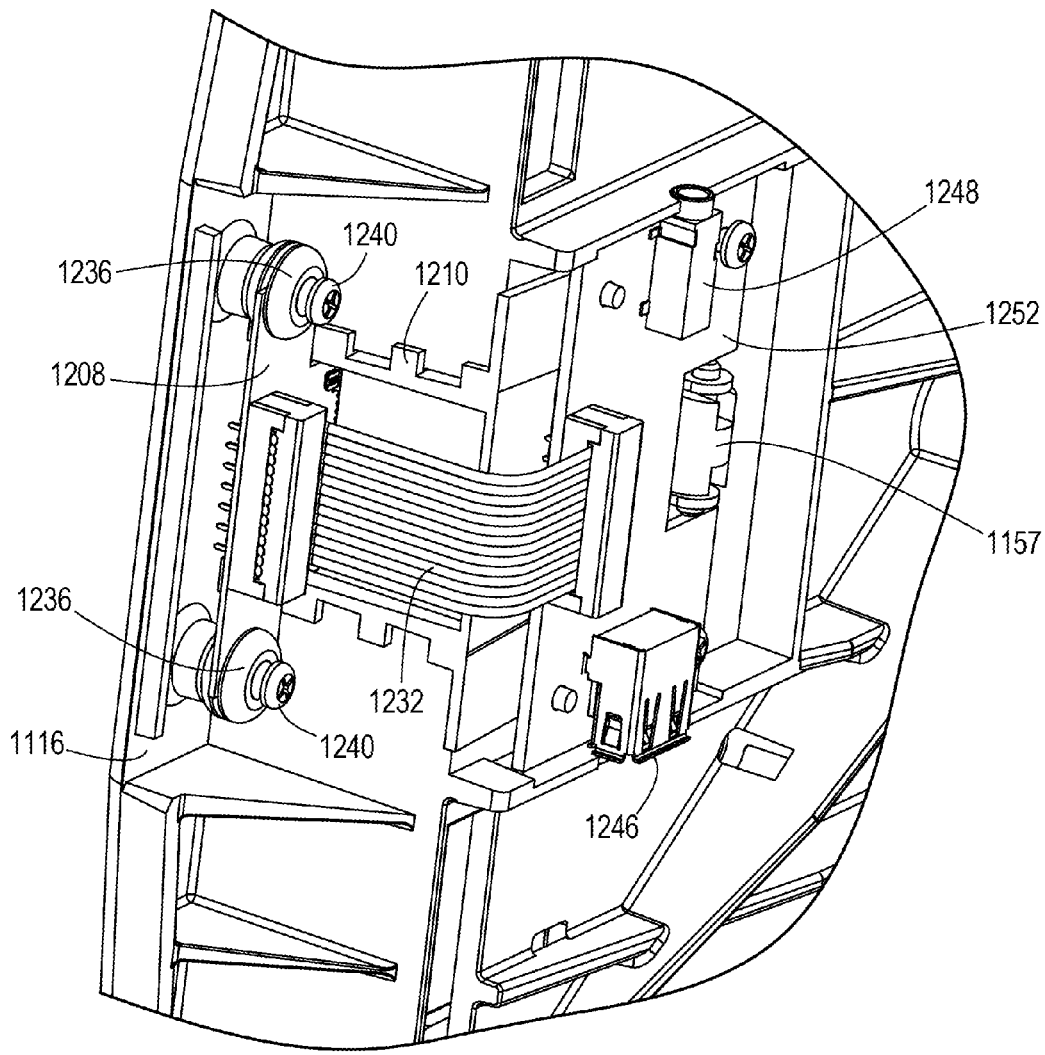
FIG. 15c is an enlarged partial view of portions of the connector assembly of FIG. 15b within the docking station.
Figure 15D:
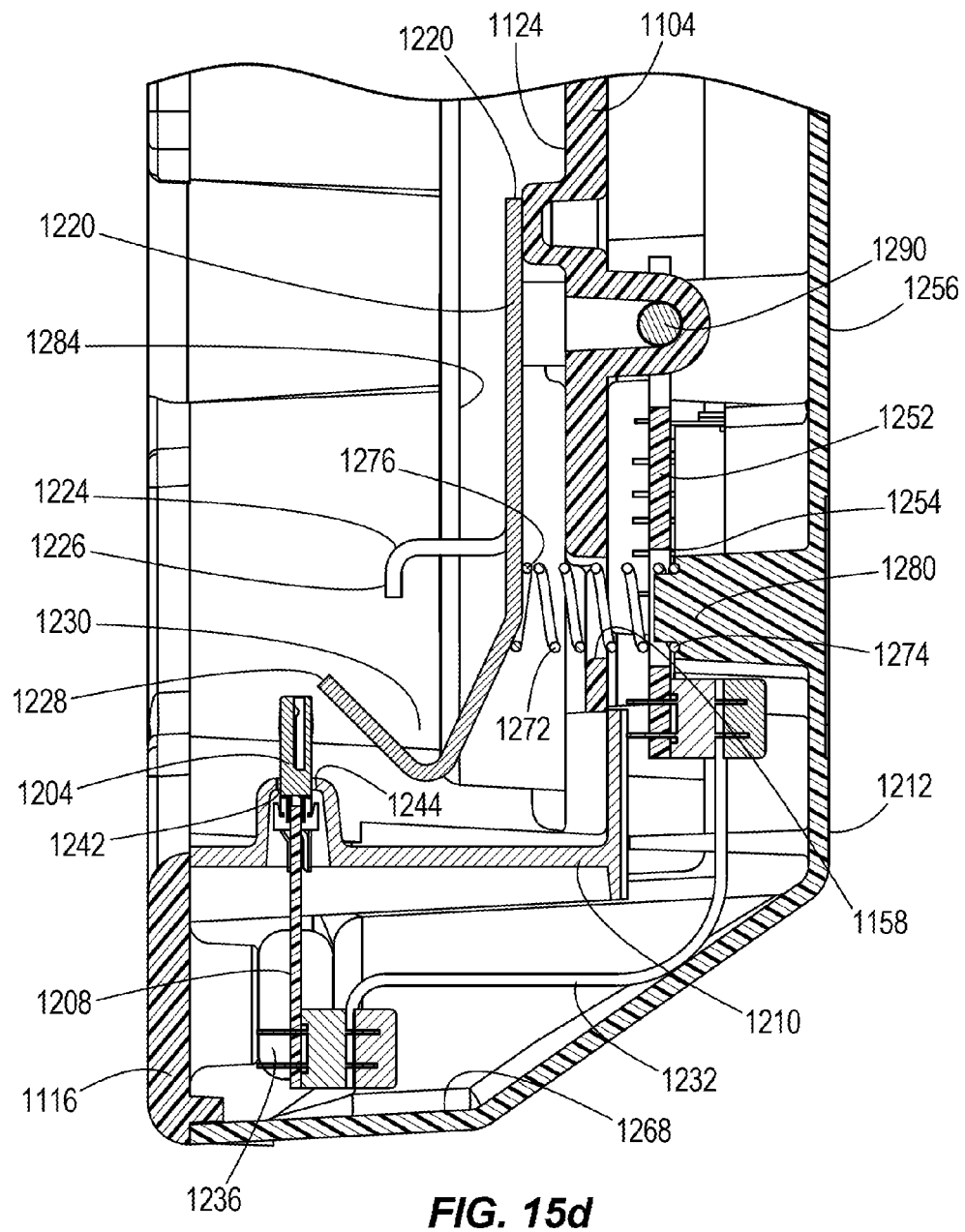

FIG. 15b shows the connector assembly 1200 apart from the base 1100. As noted, the connector assembly 1200 includes the connector 1204, the board 1208, the filler panel 1210, and the cover 1212. The connector 1204 is fixed to the board 1208, which couples the connector 1204 to a flex cable 1232. Referring also to FIGS. 15c-15d, the board 1208 is secured to a portion of the bottom lip 1116 of the base 1100 and is at least partially dynamically isolated therefrom in the vertical and horizontal directions by a pair of elastomeric grommets 1236. Specifically, the board 1208 includes opposing apertures 1238 through which a respective fastener 1240 attaches one of the grommets 1236 to the base 1100, each grommet sandwiching a portion of the board 1208, thereby resiliently coupling the board 1208 to the base 1100. As previously explained, the connector 1204 extends through the aperture 1218 of the filler panel 1210, which additionally presents first and second edges 1242, 1244 adjacent the connector 1204, thereby providing additional support to the connector 1204 should the connector 1204 and board 1208 be flexed during installation of the tablet computer 10.

Referring to FIGS. 15b-15c, the flex cable 1232 transmits electrical signals from the connector 1204 to one or more external connectors 1246, 1248 (e.g., input/output connections) fixed to a main circuit board 1252. Because the flex cable 1232 is flexible, movement of the board 1208 and the connector 1204 is not transmitted to the main circuit board 1252. In the illustrated embodiment the external connector 1246 is a USB connector and the external connector 1248 is 3.5 mm audio output connector, though other external connectors are within the scope of the presently described invention, such as video connectors, serial data connectors, or other connectors associated with a particular tablet computer. The main circuit board 1252 further includes an aperture 1254 in alignment with the aperture 1158 on the panel 1104.

The cover 1212 includes an enclosure 1256 that generally surrounds the main circuit board 1252 and external connectors 1246, 1248 from the rear side of the base 1100 (see FIG. 13b). Referring to FIG. 15b, the enclosure 1256 has openings 1260, 1264 through which the contact portions of the external connectors 1246, 1248 pass for coupling to external electronic accessories (not shown). A bottom portion 1268 of the cover 1212 positioned along the underside of the base 1100 protects the board 1208.

As further shown in FIG. 15d, a biasing element, such as a spring 1272, includes a first end 1274 and a second end 1276. The first end 1274 passes through both apertures 1158, 1254 and is coupled to a projection 1280 of the enclosure 1256. The second end 1276 operably abuts the rear face 1284 of the puller member 1220. A pivot pin 1290 (see also FIG. 13d) is rotatable within the pivot mount 1157 formed with the panel 1104 and operatively couples the pivoting members 1222 of the puller member 1220 to the panel 1104, as will be further detailed below.

Referring to FIG. 16a-16b, the slide 1300 includes a generally front planar face 1304. Rectangular slots 1308a, 1308b engage and functionally translate over the previously described "T" tabs 1128a, 1128b of the base 1100. The rectangular slots 1308a each include a narrow upper portion 1312, defined by rails 1314, and a wider bottom portion 1316a. The slots 1308b each include an upper portion 1312 defined by rails 1314 and a bottom portion 1316b. The bottom portions 1316a each include an arcuate edge 1318 formed to permit conformance with the AMPS-NEC compatible hole pattern previously described. The upper portion 1312 slides about the neck portion 1132 of each "T" tab 1128a, 1128b during retraction and extension of the slide 1300, as can be seen in FIGS. 13a and 13c, and as will be further described below. While engaged, contact between the flared portion 1130 and the rails 1314 assists in hindering frontward movement that would separate the slide 1300 from the base 1100. Contact between the neck portion 1132 and the rails 1314 prevents lateral movement between the slide 1300 and the base 1100. The bottom portions 1316a, 1316b are sized to accommodate the flared portions 1130 during assembly of the slide 1300 to the base 1100. In other embodiments, the tabs 1128a, 1128b could be on the slide 1300 while the slots 1308a, 1308b could be on the base 1100. In still other embodiments, the slots 1308b could be disposed on the walls 1108 of the base 1100 for mating with "T" tabs on the adjacent side walls 1342 of the slide 1300. In yet further embodiments, other slidable and/or grooved features could be incorporated with the walls 1108, 1342 in a mating relationship to permit the above-described sliding motion while hindering movement tending to separate the base 1100 from the slide 1300.

Figure 16C:
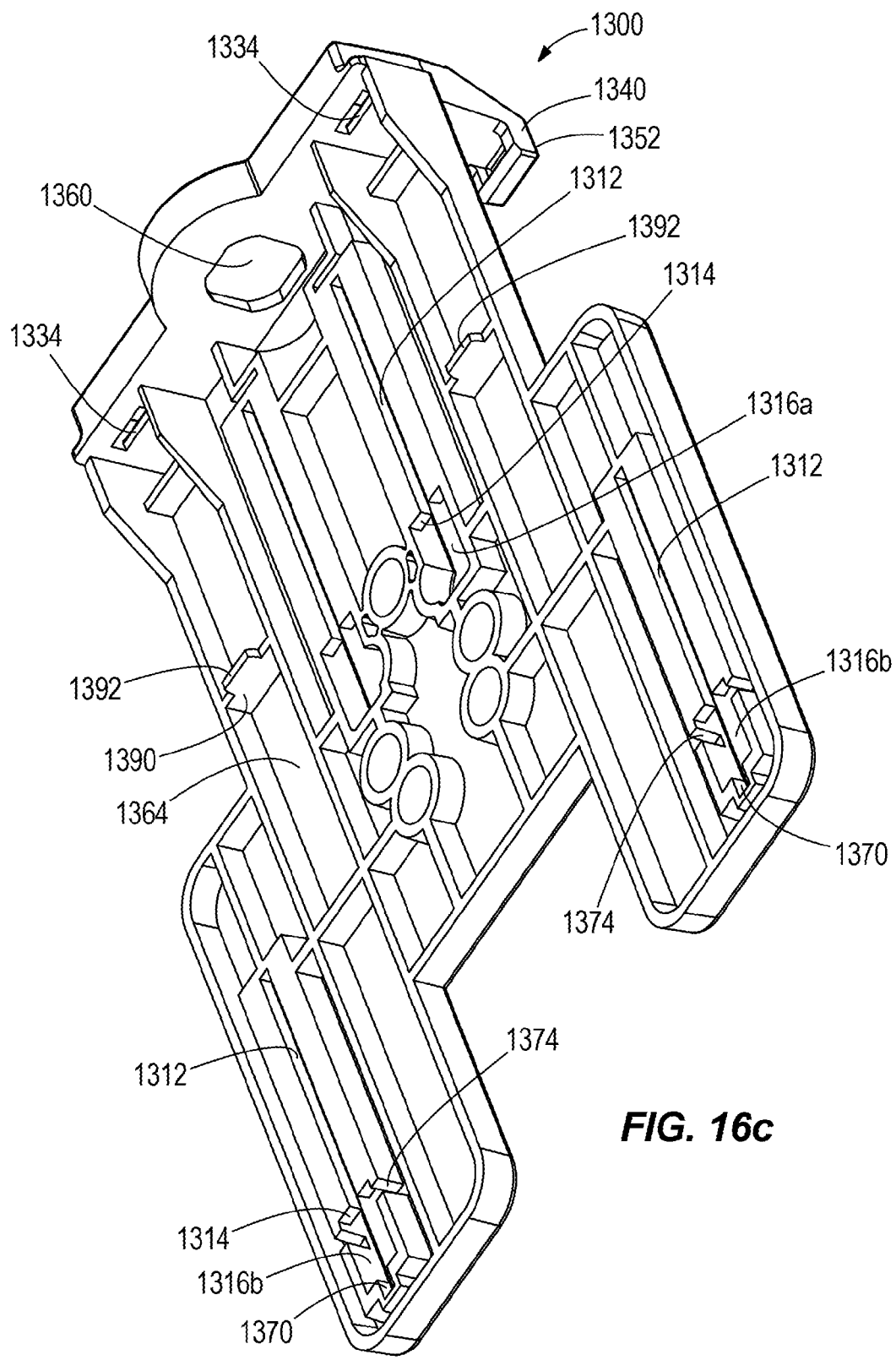
Figure 17:
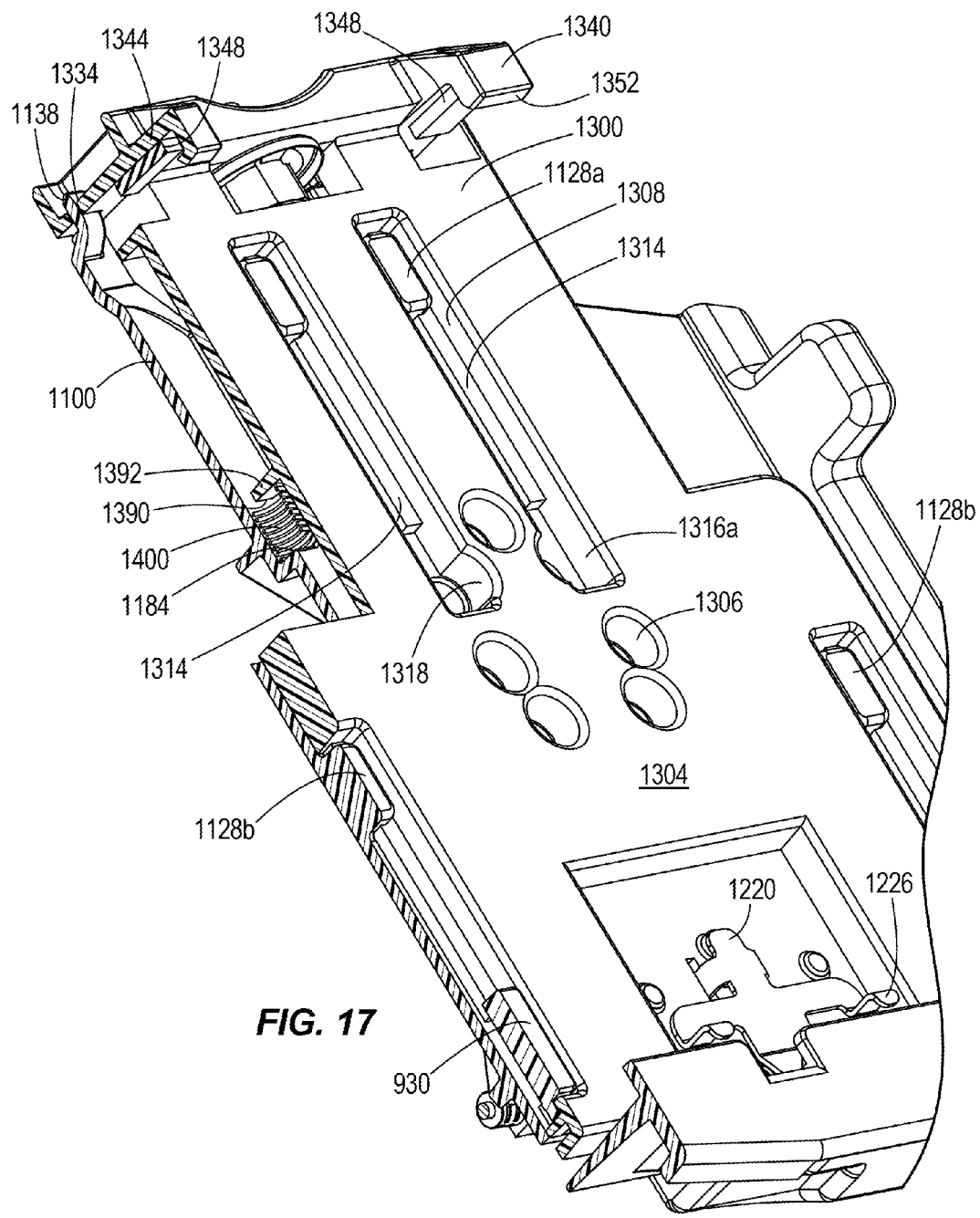
FIG. 17 is an enlarged partial section view taken along line 17-17 of FIG. 13a showing portions of the base and the slide of the docking assembly.

Referring to FIGS. 16a, 16c, and 17, which shows the assembled base 1100 and the slide 1300 when the slide 300 is in the retracted position, upper apertures or slots 1334 are sized to receive the locking projections 1138 previously described to further secure the slide 1300 to the base 1100. The slide 1300 includes a cradle 1340 having a pair of projecting base walls 1344 sized and configured to engage and support an edge of the case 1004. The walls 1344 press against the tablet case 1004 when the base 1300 is retracted, and each includes a foam pad 1348 as a contact surface to minimize damage to the edge of the case 1004 and to take up any "slack" that may be present. Overhanging lips 1352 further serve to contain the case 1004 when the slide 1300 is retracted. Mounting holes 1306 correspond with the previously described mounting holes 1148 of the base 1100 when the slide 1300 is in the retracted position, thereby allowing coupling or de-coupling of a stand or other device without disassembling the slide 1300 from the base 1100.

As also shown in FIG. 16c, the bottom portions 1316b each include a bottom slot 1370 and lateral notches 1374 to receive and retain locking members such as inserts 930 previously described in connection with FIGS. 10d and 10e. The inserts 930 operate to limit movement of the slide 1300 during retraction and extension in the same manner, as shown in FIGS. 13a and 13c.

During assembly of the slide 1300 to the base 1100, the slide 1300 is positioned such that the flared portions 1130 of the "T" tabs 1128a, 1128b pass through the wider portions 1316a, 1316b, respectively, of the rectangular slots 1308a, 1308b. The slide 1300, now uniformly adjacent to the base 1100, is located beyond the furthest point of normal extension relative to the base 1100 in operation and must be extended for insertion of the block 930 as previously described.

Referring again to FIG. 16c, the upper portion of the slide 1300 defines an opening 1360 for partially receiving the lock 1404 (see FIGS. 13b and 13d). The lock mechanism 1404, e.g., a slam lock, is secured to the slide 1300 and is operable to selectively retain the slide 1300 in the retracted position. When the tablet computer 10 is docked in the docking station 1020 and the lock mechanism 1404 activated to retain the slide 1300, the tablet computer 10 cannot be removed from the docking station 1020 because the cradle 1340 cannot move separately from the slide 1300. Other lock mechanisms can be substituted for the illustrated slam lock, such as a twist knob lock or other type of lock.

Figure 18A:
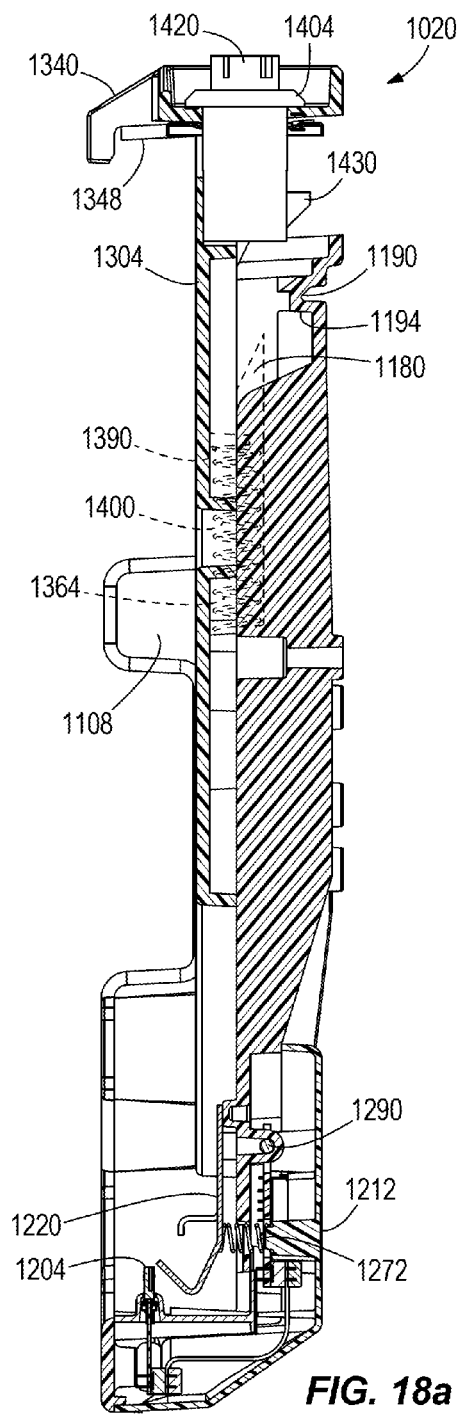
FIG. 18a is a section view of the docking assembly in an extended position taken along line 18a-18a of FIG. 13c.
Figure 18B:
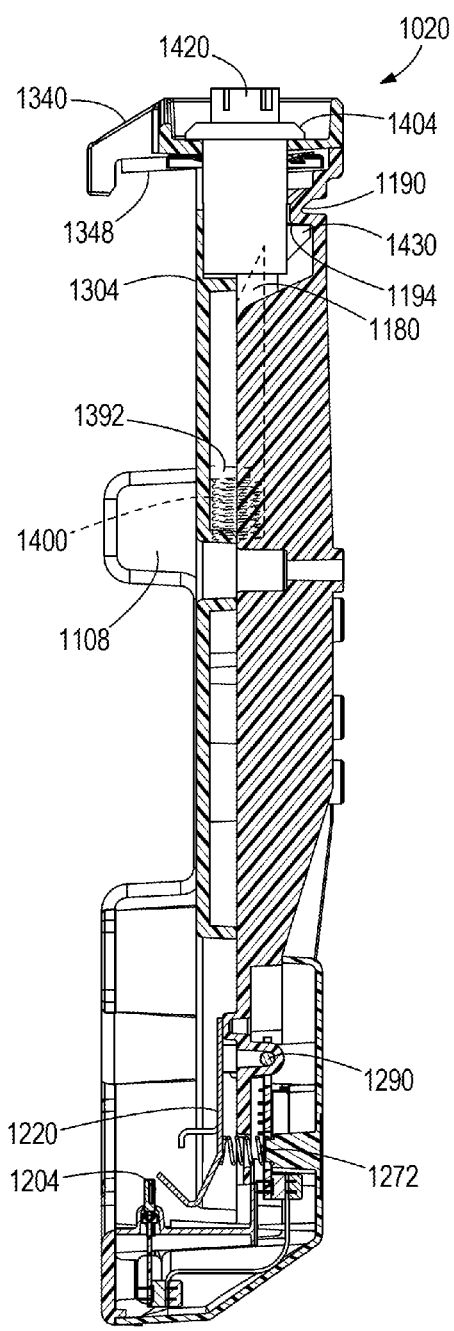

With respect to FIGS. 13d, 18a, and 18b, the lock 1404 can be secured to the slide 1300 using a standard nut, if threaded, or alternatively retained by a combination of a wave washer and a push nut. The lock 1404 includes a retractable pawl 1430 that, upon contact with a lip 1190 of the base 1100 during retraction of the slide 1300, recedes into the body of the lock 1404. Once the pawl 1430 passes the lip 1190, the pawl 1430 once again extends from the lock 1404 and is positioned underneath the lip 1190 against an underside edge 1194. Any contacting force tending to extend the slide 1300 is resisted through contact of the pawl 1430 with the underside edge 1194, preventing the biasing springs 1400 from extending the slide 1300 upward. The biasing springs 1400 are positioned underneath and are operatively coupled to a bottom surface 1390 of a ledge 1392 of the slider 1300, as best shown in FIGS. 16c and 17. The biasing springs 1400 are partially disposed within a slide spring cavity 1364, and partially disposed within a corresponding base spring cavity 1180, best shown in FIGS. 14a and 14b. The slide spring cavity 1364 and the base spring cavity 1180 cooperate to enclose and bias the springs 1400 upon assembly of the base 1100 with the slide 1300. A bottom end 1416 of each biasing spring 1400 engages a respective shelf 1184 that forms the bottom of the base spring cavity 1180. In an alternative embodiment, one or more biasing springs 1400 are positioned adjacent the connector 1204 and operatively coupled at one end to the bottom surface 1160 and at the other end to a bottom surface of the slide 1300 to provide the above-described biasing force.

Referring to FIGS. 18a and 18b, the docking station 1020 is functionally movable between an extended position (FIG. 18a), in which the tablet computer 10 can be inserted or extracted, and a retracted position (FIG. 18b), in which the tablet computer 10 is secured by and within the docking station 1020. In operation, referring also to FIGS. 19a and 19b, a user disposes the tablet computer 10 within the case 1004 downwardly and along the front face 1304 of the slide 1300, aligning the tablet computer 10 with the connector 1204. As the external bottom surface of the case 1004 approaches the connector 1204, the connector flap 1010 contacts the receiving flap 1228 of the puller member 1220, biased to the position illustrated in FIG. 19a. As the receiving flap 1228 engages the connector flap 1010, the external surface of the case 1004 laterally adjacent to the flap 1010 concurrently contacts the downwardly curving ends 1226 of the opposing arms 1224. As the tablet computer 10 within the case 1004 continues to move toward the connector 1204, the arms 1224 follow the profile of the case 1004 and are thereby moved downward, forcing the rear face 1284 of puller member 1220 against the second end 1276 of the biasing member 1272 and rotating the puller member 1220 about the pivot pin 1290. This rotation of the receiving flap 1228 moves the connector flap 1010 to fully expose the connector port 1012 and permits continued movement of the tablet computer 10 downward into connection with the connector 1204, without interference from the connector flap 1010 and the receiving flap 1228. When connected, the tablet computer retains the puller member 1220 in the position illustrated in FIG. 19b, with the connector flap 1010 situated within the receptacle 1230.

Referring again to FIGS. 18a and 18b, once the tablet computer 10 is suitably positioned and electrically coupled to the connector 1204, the user can depress the cradle 1340, which forces the slide 1300 downward against the upward force of the biasing springs 1400. The tablet computer 10 is pressed by the cradle 1340, through contact with the foam pad 1348, and secured. Concurrently, as shown in FIGS. 13a, 13c, and 17, the upper portions 1312 of the rectangular slots 1308 travel over and are constrained by the flared portions 1130 of the "T" tabs 1128a, 1128b previously described, while the upper slots 1334 receive the locking projections 1138 that extend therethrough, hindering separation of the slide 1300 from the base 1100 in a direction normal to the direction of translation of the slide 1300 relative to the base 1100.

Once electrically coupled, the USB connector can be used to charge the tablet computer 10 or to synchronize the tablet computer 10 with another computer. The audio connection can be used for outputting audio to a car head unit or to powered speakers.

To extract the tablet computer 10, the user pushes down on the push button 1420 of the lock 1404. This releases the pawl 1430, which recedes into the lock 1404, allowing the springs 1400 to bias the slide 1300 upward. Once the slide 1300 is sufficiently extended, the tablet computer 10 can be extracted from the docking station 1020. As previously described, the lock 1404 can be a keyed lock to prevent unauthorized removal of the tablet computer 10.

Various features and advantages of the invention are set forth in the following claims.

What is claimed is:

1. A docking station for an electronic device contained within a case, the case including a retractable connector access panel at least partially overlying a portion of a connector port of the electronic device, the docking station comprising:

a base at least partially configured to support the electronic device;

an electrical connector coupled to the base and configured to receive the connector port of the electronic device;

a retraction member coupled to the base and configured to retract the connector access panel to at least partially expose the connector port during docking of the electronic device; and a slide translatably coupled to the base and adjustable from a retracted position to an extended position, the slide including a cradle for securing the electronic device to the base.

2. The docking station of claim 1, wherein the retraction member is pivotally coupled to the base.

3. The docking station of claim 1, wherein the retraction member is configured to move from a first position to a second position upon contact with the case during docking of the electronic device.

4. The docking station of claim 1, wherein the retraction member further includes a receiving surface positioned to operatively engage the connector access panel during docking of the electronic device.

5. The docking station of claim 4, wherein the receiving surface defines a receptacle sized to hold the connector access panel.

6. The docking station of claim 4, wherein the retraction member further includes a contact surface separate from the receiving surface, and wherein the contact surface is configured to contact an external surface of the case during docking of the electronic device to pivot the retraction member.

7. The docking station of claim 6 wherein the contact surface comprises a pair of arms extending away from the base.

8. The docking station of claim 4, wherein the receiving surface comprises an arm extending away from the base.

9. The docking station of claim 8, wherein a pair of arms comprising a contact surface are disposed on opposite sides of the arm comprising the receiving surface.

10. The docking station of claim 1, wherein the slide includes a cutout through which the retraction member extends to retract the connector access panel.

11. The docking station of claim 10, further including a spring having a first end in contact with the base and a second end in contact with the slide, wherein the spring biases the slide to the extended position.

12. The docking station of claim 10, further including a push button locking mechanism fixed to the slide, wherein the second end of the spring is operatively coupled to a bottom surface of the locking mechanism and wherein a top surface of the locking mechanism includes a push button.

13. A docking station for an electronic device contained within a case, the case including a retractable connector access panel at least partially overlying a portion of a connector port of the electronic device, the docking station comprising:

a base at least partially configured to support the electronic device;

a slide translatably coupled to the base and adjustable from a retracted position to an extended position, the slide including a cradle for securing the electronic device to the base; and a retraction member coupled to the base and configured to retract the connector access panel to at least partially expose the connector port during docking of the electronic device.

14. The docking station of claim 13, wherein the retraction member is pivotally coupled to the base.

15. The docking station of claim 13, wherein the retraction member further includes a receiving surface positioned to operatively engage the connector access panel during docking of the electronic device.

16. The docking station of claim 15, wherein the receiving surface defines a receptacle sized to hold the connector access panel.

17. The docking station of claim 13, wherein the retraction member further includes a contact surface separate from the receiving surface, and wherein the contact surface is configured to contact an external surface of the case during docking of the electronic device to pivot the retraction member.

18. The docking station of claim 17, wherein the receiving surface comprises an arm extending away from the base and the contact surface comprises a pair of arms extending away from the base with the pair of arms disposed on opposite sides of the arm comprising the receiving surface.

19. The docking station of claim 13, wherein the slide includes a cutout through which the retraction member extends to retract the connector access panel.

* * * * *